(12) United States Patent
Yoneno

(10) Patent No.: US 8,274,531 B2
(45) Date of Patent: Sep. 25, 2012

(54) DISPLAY APPARATUS FOR PROJECTING OVERLAPPING WINDOWS WITH LIGHT MODULATION VALVES

(75) Inventor: Kunio Yoneno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 493 days.

(21) Appl. No.: 12/571,238

(22) Filed: Sep. 30, 2009

(65) Prior Publication Data
US 2010/0097393 A1    Apr. 22, 2010

(30) Foreign Application Priority Data

Oct. 17, 2008    (JP) ................................. 2008-268632

(51) Int. Cl.
*G09G 5/00* (2006.01)
(52) U.S. Cl. ........ 345/629; 345/698; 345/594; 345/595; 345/596
(58) Field of Classification Search .......... 345/594–596, 345/698, 629
See application file for complete search history.

(56) References Cited

U.S. PATENT DOCUMENTS

| 8,013,283 | B2 * | 9/2011 | Lee et al. .................... 250/208.1 |
| 2002/0071103 | A1 * | 6/2002 | Satou .............................. 353/94 |
| 2005/0116968 | A1 * | 6/2005 | Barrus et al. .................. 345/698 |
| 2007/0013716 | A1 * | 1/2007 | Kjeldsen et al. .............. 345/594 |

FOREIGN PATENT DOCUMENTS

| JP | 2000-276123 | 10/2000 |
| JP | 2004-070257 | 3/2004 |
| JP | 2007-065542 | 3/2007 |

* cited by examiner

*Primary Examiner* — Jin-Cheng Wang
(74) *Attorney, Agent, or Firm* — Maschoff Gilmore & Israelsen

(57) ABSTRACT

A display apparatus adapted to generate image data for controlling a first light modulation section adapted to project a first window, and image data for controlling a second light modulation section adapted to project a second window smaller than the first window and projected so as to overlap with the first window, includes: a first image conversion section adapted to convert a resolution of input image data in accordance a resolution of the first light modulation section to form the image data for controlling the first light modulation section; and a second image conversion section adapted to extract data included in a range corresponding to a resolution of the second light modulation section among the input image data to form the image data for controlling the second light modulation section.

17 Claims, 20 Drawing Sheets

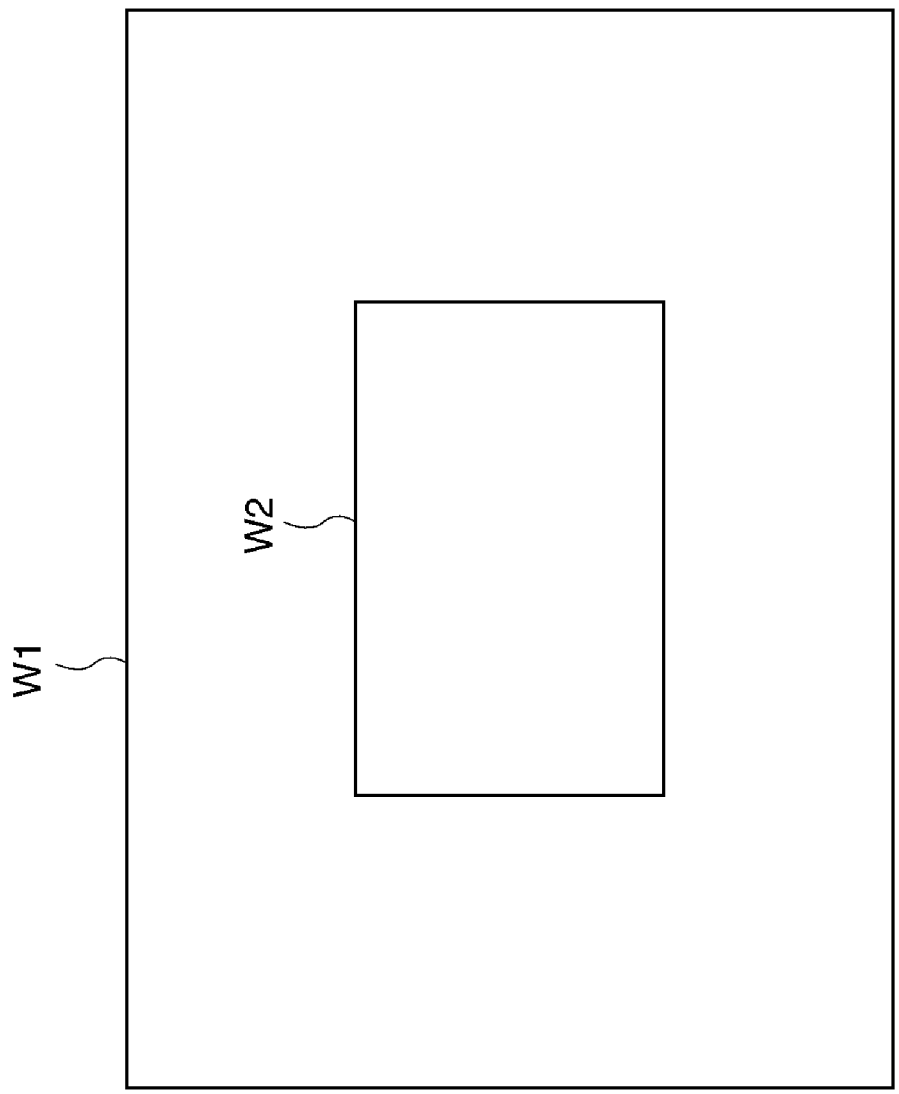

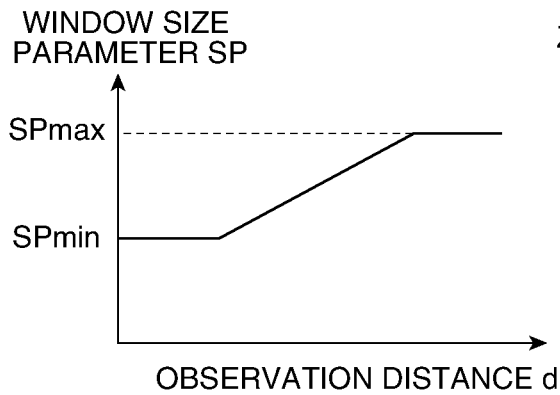
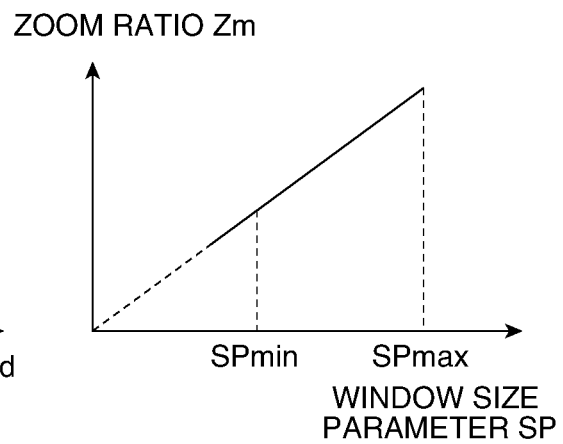
FIG. 10A　　　　　　FIG. 10B
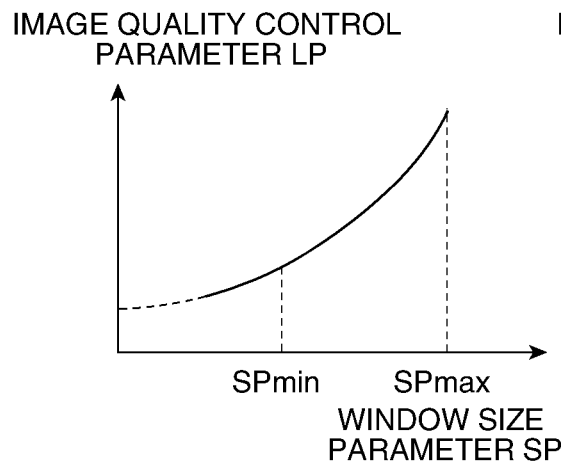
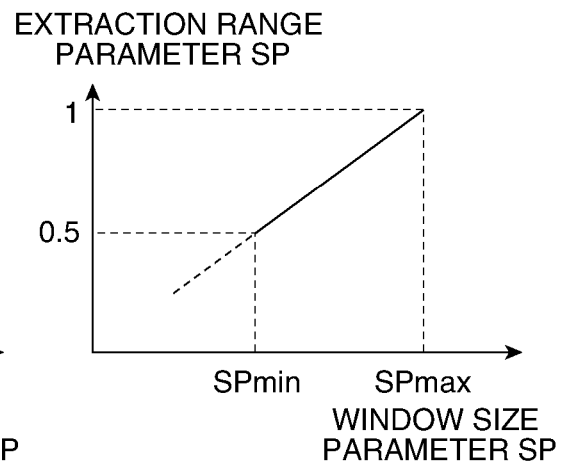
FIG. 10C　　　　　　FIG. 10D

DISPLAY APPARATUS FOR PROJECTING OVERLAPPING WINDOWS WITH LIGHT MODULATION VALVES

BACKGROUND

1. Technical Field

The present invention relates to a display apparatus, in particular to a display apparatus for projecting a first window with a first light modulation section and projecting a second window smaller than the first window with a second light modulation section in an overlapping manner.

2. Related Art

Since the past, in work using CAD, simulations, and so on, there have been a lot of cases in which details of a partial image of a display image such as a design drawing is confirmed while confirming the overall picture thereof, and in the case in which a display with a general purpose pixel count such as XGA is used, it is required to repeat zooming in and zooming out of the display image, which incurs decrease in work efficiency. Further, in the case in which the image is zoomed in for confirming the details of the partial image, the overall picture of the image becomes invisible, and therefore, it is difficult to grasp the positional relationship of the partial image with the overall picture.

To cope with such a problem, it is desirable to use a high-resolution display capable of displaying an image pixel by pixel in accordance with a high pixel count image signal to be input thereto. Further, in order for confirming a detailed image, it is desirable that the pixel itself has a size of a visible level, and in that sense, projectors having a somewhat large display screen are one of the most suitable display apparatuses. However, in order for performing display based directly on the image signal with high pixel count, a projector provided with a light valve (e.g., a liquid crystal light valve) corresponding to the input image signal is required, which leads to incurring increase in apparatus cost.

On the other hand, in a display with a large screen, it is natural for the user to view the screen from a position distant from the display to some extent when viewing the overall picture, and from a position close to the display because of limitation in resolution of the eyesight when viewing details thereof.

Therefore, JP-A-2004-70257 (Document 1) discloses a projector capable of projecting a window representing partially detailed information in a screen displaying an overall picture in an overlapping manner, thereby confirming partial details without using a high-resolution display. Further, JP-A-2000-276123 (Document 2) and JP-A-2007-65542 (Document 3) disclose a technology of varying the display resolution in accordance with the observation distance of the user to the screen. For example, the technology of the Document 2 is for detecting the distance between the observer and the screen by a remote controller, and expanding the display image in the case in which the distance is large while shrinking the display image in the case in which the distance is small, thereby keeping the apparent resolution constant. The technology of the Document 3 is for controlling a zoom lens in accordance with the observation distance, thereby always displaying the overall information of the screen with the highest observable resolution for the observer.

In the Document 1 described above, details of the control of the size and the position of the display made by a local projection projector adapted to perform display of a partial detailed image, for example, are not at all disclosed, and therefore, the disclosure thereof is insufficient for coping with the problem described above. Further, in either one of the Document 2 and the Document 3, since the size of the object varies in accordance with the observation distance, the size of the object thus displayed as described above does not vary, which is not suitable for the natural action of viewing the screen from a position closer thereto for confirming the details. Further, the action thereof is adverse to the action of getting closer for viewing the details in such away that the object displayed thereon becomes larger as the observation distance increases and smaller as it decreases, which is not suitable for CAD, simulations, and so on.

SUMMARY

An advantage of some aspects of the invention is to provide a display apparatus capable of achieving the function equivalent to a high-resolution display with a relatively low cost, and of performing the display corresponding to the natural human action of getting away from the screen for viewing the overall picture while getting closer to the screen for viewing the details.

According to an aspect of the invention, there is provided a display apparatus adapted to project, on a first window projected by a first light modulation section, a second window smaller than the first window by a second light modulation section in an overlapping manner, and including a first image conversion section adapted to convert a resolution of input image data in accordance a resolution of the first light modulation section to form the image data for controlling the first light modulation section, a second image conversion section adapted to extract data included in a range corresponding to a resolution of the second light modulation section among the input image data to form the image data for controlling the second light modulation section.

According to the display apparatus having such a feature as described above, it is possible to display the second window with a higher resolution (the resolution of the input image data), while displaying the first window with a lower resolution (the resolution of the first light modulation section). In other words, in the work operation using CAD or a simulation, since there are a lot of cases in which it is enough to display partial detailed information in the second window with a higher resolution while displaying the overall picture in the first window with a lower resolution, it is possible to realize a desired characteristic at relatively low coast compared to the case of displaying the overall picture with a high resolution as in the related art. Further, since the observer gets away from the screen in the case of attempting to observe the whole at a time, it is not required to make the details visible in view of human eyesight, and further, since the observer gets closer to the screen in the case of observing the details, the range, which can be viewed in human eyesight at a time, becomes limited, and therefore, it is enough to make it possible to perform detailed display (high-resolution display) in part.

Further, according to another aspect of the invention, there is provide a display apparatus adapted to project, on a first window projected by a first light modulation section, a second window smaller than the first window by a second light modulation section in an overlapping manner, and includes a first image conversion section adapted to convert a resolution of input image data in accordance a resolution of the first light modulation section to form the image data for controlling the first light modulation section, a window size parameter generation section adapted to generate a window size parameter for designating a size of the second window, a zoom ratio setting section adapted to set a zoom ratio of a projection lens disposed on a posterior stage of the second light modulation section based on the window size parameter, an extraction range setting section adapted to set an extraction range parameter for designating a range of data to be extracted among the input image data based on the window size parameter, a second image conversion section adapted to extract data included in an extraction range designated by the extraction range parameter from the input image data, and to convert a resolution of the extracted data according to needs from a relationship between the extraction range and a resolution of the second light modulation section, thereby forming the image data for controlling the second light modulation section, and a zoom control section adapted to control a zoom action of the projection lens in accordance with the zoom ratio set by the zoom ratio setting section.

According to the display apparatus having such a feature as described above, the size of the second window can arbitrarily controlled using the value of the window size parameter, and the resolution of the second window can automatically be controlled in accordance with the size thereof. In other words, by reducing the second window by the window size parameter in the case in which the observer is located near the screen, and enlarging the second window when the observer is located away from the screen, it is possible to perform display corresponding to the natural human action of getting away from the screen for viewing the overall picture and getting closer to the screen for viewing the details.

Further, in the display apparatus described above, it is preferable that the window size parameter generation section sets the window size parameter so that a size of an image displayed in the second window becomes constant irrespective of the size of the second window.

Thus, it is possible in the case of varying the size of the second window to prevent the difference in size between the images displayed in the first window and the second window from occurring, thus it becomes possible to perform display without providing uncomfortable feeling to the observer.

Further, in the display apparatus described above, it is preferable that an observation distance measurement section adapted to measure an observation distance from a projection screen of the first and second windows to an observer is further provided, and the window size parameter generation section generates the window size parameter based on a measurement result of the observation distance by the observation distance measurement section.

Thus, it is possible to automatically control the size of the second window in accordance with the observation distance of the observer to the screen. In other words, by automatically reducing the second window when the observer is located at a position near the screen, and by automatically enlarging the second window when the observer is located at a position away from the screen, it is possible to perform display corresponding to the natural human behavior.

Further, in the display apparatus described above, it is preferable that there are further provided an image quality setting section adapted to set an image quality control parameter for controlling image quality of the second window based on the window size parameter, and an image quality control section adapted to execute an image quality control process on the image data for controlling the second light modulation section obtained from the second resolution conversion section in accordance with the image quality control parameter.

More specifically, it is preferable to set an image quality control parameter for controlling the brightness of the second window.

Thus, it becomes possible to automatically control the image quality of the second window in accordance with the size of the second window. In particular, by automatically controlling the brightness, which is a significant factor for determining the image quality, improvement of the image quality of the second window can be achieved.

Further, according to still another aspect of the invention, there is provided a display apparatus adapted to project, on a first window projected by a first light modulation section, a second window smaller than the first window by a second light modulation section in an overlapping manner, and includes a first image conversion section adapted to convert a resolution of input image data in accordance a resolution of the first light modulation section to form the image data for controlling the first light modulation section, a display position parameter generation section adapted to generate a display position parameter for designating a display position of the second window, an extraction range setting section adapted to set an extraction range parameter for designating a range of data to be extracted among the input image data, a second image conversion section adapted to move a position of the extraction range designated by the extraction range parameter based on the display position parameter, and to extract data included in the extraction range having been moved among the input image data to form the image data for controlling the second light modulation section, and a display position control section adapted to control the display position of the second window based on the display position parameter.

According to the display apparatus having such a feature as described above, since the display position of the second window can arbitrarily controlled in accordance with the value of the display position parameter, the observer can freely display the desired verification section in the second window with a higher resolution, improvement in work efficiency can be achieved.

Further, in the display apparatus described above, it is preferable that an observation location detection section adapted to detect an observation location of an observer in a plane parallel to the projection screen of the first and second windows is further provided, and the display position parameter generation section generates the display position parameter based on an observation location detection result by the observation location detection section.

Thus, it is possible to automatically control the display position of the second window in accordance with the observation position of the observer to the screen, which making a contribution to improvement in work efficiency.

Further, in the display apparatus described above, it is preferable that a window size parameter generation section adapted to generate a window size parameter for designating a size of the second window, a zoom ratio setting section adapted to set a zoom ratio of a projection lens disposed on a posterior stage of the second light modulation section based on the window size parameter, and a zoom control section adapted to control a zoom action of the projection lens in accordance with the zoom ratio set by the zoom ratio setting section are further provided, and the extraction range setting section sets the extraction range parameter based on the window size parameter, and the second image conversion section converts a resolution of the extracted data according to needs from a relationship between the extraction range designated by the extraction range parameter and the resolution of the second light modulation section, thereby forming the image data for controlling the second light modulation section.

Thus, the display position of the second window can arbitrarily be controlled, and further, the size of the second window can also be controlled arbitrarily by the value of the window size parameter, and the resolution of the second window can automatically be controlled in accordance with the size thereof.

Further, according to still another aspect of the invention, there is provided a display apparatus adapted to project, on a first window projected by a first light modulation section, a second window smaller than the first window by a second light modulation section in an overlapping manner, and includes a first image conversion section adapted to convert a resolution of input image data in accordance a resolution of the first light modulation section to form the image data for controlling the first light modulation section, a content analysis section adapted to analyze a characteristic of a content of the input image data, an observation information determination section adapted to determine an observation location of an observer based on an analytical result of the characteristic of the content by the content analysis section, a display position parameter generation section for generating the display position parameter for designating the display position of the second window based on the observation location determined by the observation information determination section, an extraction range setting section adapted to set an extraction range parameter for designating a range of data to be extracted among the input image data, a second image conversion section adapted to move a position of the extraction range designated by the extraction range parameter based on the display position parameter, and to extract data included in the extraction range having been moved among the input image data to form the image data for controlling the second light modulation section, and a display position control section adapted to control the display position of the second window based on the display position parameter.

According to the display apparatus having such a feature as described above, it becomes possible to automatically control the display position of the second window in accordance with the characteristic of the content of the input image data.

Further, in the display apparatus described above, it is preferable that the observation information determination section determines an observation distance in addition to the observation location of an observer based on the analytical result of the characteristic of the content, the display apparatus further includes a window size parameter generation section adapted to generate a window size parameter for designating the size of the second window based on the observation distance determined by the observation information determination section, a zoom ratio setting section adapted to set a zoom ratio of a projection lens disposed on a posterior stage of the second light modulation section based on the window size parameter, and a zoom control section adapted to control a zoom action of the projection lens in accordance with the zoom ratio set by the zoom ratio setting section, and the extraction range setting section sets the extraction range parameter based on the window size parameter, and the second image conversion section converts a resolution of the extracted data according to needs from a relationship between the extraction range designated by the extraction range parameter and the resolution of the second light modulation section, thereby forming the image data for controlling the second light modulation section.

According to the above, the display position of the second window can automatically be controlled in accordance with the characteristic of the content of the input image data, and in addition, the size of the second window can also be controlled arbitrarily, and the resolution of the second window can automatically be controlled in accordance with the size thereof.

Further, in the display apparatus described above, it is preferable that a blanking control section adapted to perform control so as to inhibit projection of projection light by the first light modulation section in an area where the first window and the second window overlap with each other.

According to this aspect, even in the case in which the display positional relationship between the first window and the second window is slightly varied, there is no chance that the second window displaying important information overlaps the first window in the periphery thereof, thus degradation in the resolution of the projection image can be prevented.

Further, in the display apparatus described above, it is preferable that the first light modulation section and the second light modulation section have the same resolution.

According to the above, since the light modulation section with the same resolution can be used, the same model can commonly be used therein, and further, since it is enough to prepare a single unit of the same model as maintenance equipment, it is possible to achieve reduction of maintenance cost.

Further, in the display apparatus described above, it is preferable that the resolution of the first light modulation section and the second light modulation section is lower than the resolution of the input image data.

Thus, the advantage of realizing the same function as the high-resolution display at relatively low cost becomes prominent.

BRIEF DESCRIPTION OF THE DRAWINGS

The invention will now be described with reference to the accompanying drawings, wherein like numbers reference like elements.

FIG. 4 is a diagram showing projection windows W1 and W2 displayed on a screen SC by the display apparatus 1.

FIGS. 10A through 10D are explanatory diagrams related to the respective parameters of the parameter generation section 33 in the display apparatus 2.

DESCRIPTION OF EXEMPLARY EMBODIMENTS

Hereinafter, an embodiment of a display apparatus according to the invention will be explained with reference to the accompanying drawings.

First Embodiment

Figure 1:
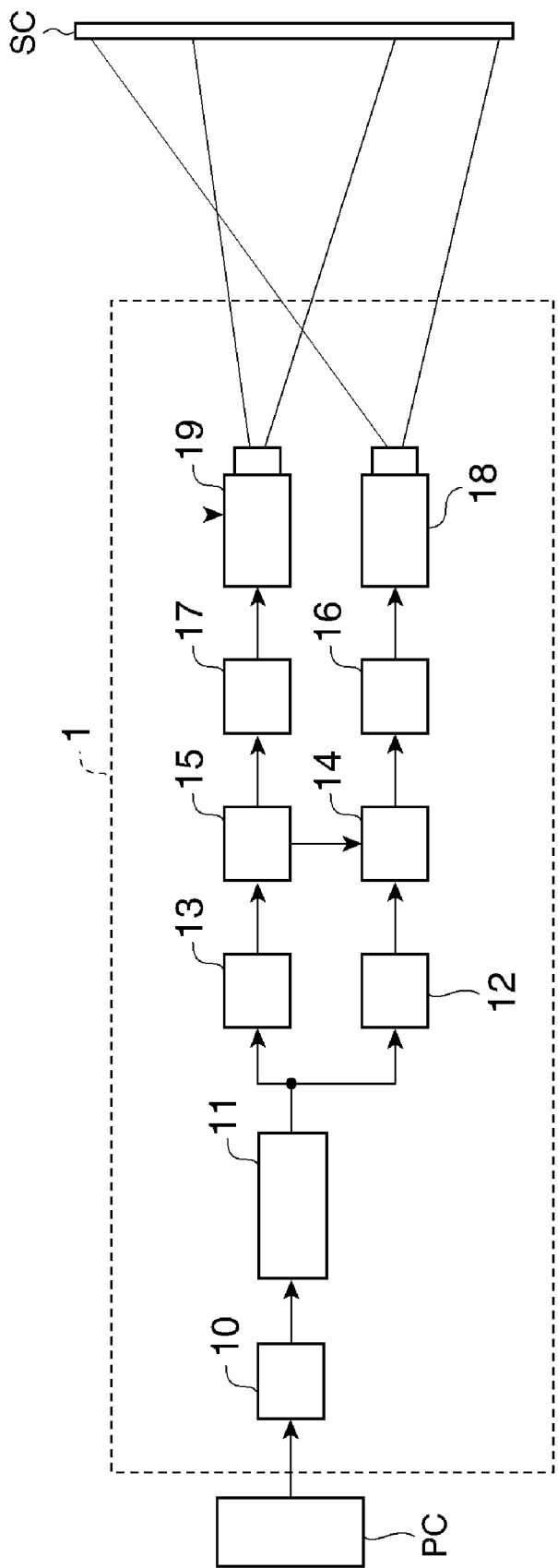
FIG. 1 is a schematic diagram of a configuration of a display apparatus 1 according to a first embodiment of the invention.

Firstly, a display apparatus according to a first embodiment of the invention will be explained. FIG. 1 is a schematic diagram of a configuration of the display apparatus 1 according to the first embodiment. As shown in FIG. 1, the display apparatus 1 is composed of an A/D converter 10, an image memory 11, a first resolution conversion circuit 12, a second resolution conversion circuit 13, a first image buffer 14, a second image buffer 15, a first output circuit 16, a second output circuit 17, a first projector 18, and a second projector 19.

The display apparatus 1 thus configured is for projecting an image corresponding to the image signal input from a computer PC to display it on a screen SC. The computer PC is capable of processing the image signal, for example, of a personal computer or a DVD player. Further, the screen SC can be either one of a front screen observed from a projection side and a rear screen observed from an opposite side to the projection side.

The A/D converter 10 converts the image signal input from the computer PC into digital data, and outputs image data thus obtained to the image memory 11. Here, in the present embodiment, there is assumed a signal of QXGA (2048×1536), which has a resolution (pixel count) two times as high (large) as XGA (1024×768) in both of horizontal and vertical directions, as the image signal transmitted from the computer PC. Further, although the image signal output from the computer PC is generally composed of signals corresponding respectively to three colors of R (red), G (green), and B (blue), since the three lines are output in parallel to each other in reality, and the processes in the display apparatus 1 are also executed simultaneously, the explanations will hereinafter be presented focusing attention on a signal of one of the three lines as a representative.

It should be noted that in the case in which the output of the computer PC is digital data, it is not required to provide the A/D converter 10, and it is enough to directly connect the image memory 11 and the computer PC to each other. Further, a dot clock signal, a timing signal, and so on necessary for operation of the A/D converter 10 and writing of the image data in the image memory 11 are generated by a timing circuit not shown such as a PLL circuit based on a sync signal included in the image signal.

The image memory 11 divides the image data input from the A/D converter 10 into data each corresponding to one pixel, and stores the data in a memory area to which addresses "0" through "2047" in the X direction and addresses "0" through "1535" in the Y direction are assigned. Further, the image memory 11 outputs the image data stored therein to the first resolution conversion circuit 12 and the second resolution conversion circuit 13 at predetermined timing. It should be noted that the image memory 11 is required to have a capacity enough to store the image data (the data corresponding to the pixel count of 2048×1536) corresponding to at least one frame.

The first resolution conversion circuit (a first image conversion section) 12 converts the resolution of the image data input from the image memory 11 so as to correspond to the resolution of a liquid crystal light valve (see a first light modulation section in FIG. 3) provided to the first projector 18. As described later, since it is assumed that the resolution of the liquid crystal light valve used in the present embodiment is XGA, the first resolution conversion circuit 12 converts the resolution (QXGA) of the image data input from the image memory 11 into XGA, and outputs the image data with the converted resolution to the first image buffer 14.

The second resolution conversion circuit (a second image conversion section) 13 extracts the image data included in a size (range) corresponding to the resolution of a liquid crystal light valve (a second light modulation section) provided to the second projector 19 among the image data input from the image memory 11. As described later, since it is assumed that the resolution of the liquid crystal light valve used in the present embodiment is XGA, the second resolution conversion circuit 13 extracts the data included in the size (i.e., a half size) corresponding to XGA among the image data (QXGA). More specifically, the second resolution conversion circuit 13 extracts the image data included in the range corresponding to the X address of "511" through "1535" and the Y address of "383" through "1151" among the image data, and outputs it to the second image buffer 15.

The first image buffer 14 buffers the image data (the image data converted to XGA) input from the first resolution conversion circuit 12, and outputs the image data, which is stored therein, to the first output circuit 16 at predetermined timing. Further, the first image buffer 14 has a function of converting the image data at a predetermined address into black data and then outputting it in response to a blanking signal input from the second image buffer 15.

The second image buffer (a blanking control section) 15 buffers the image data (the image data corresponding to an XGA size) input from the second resolution conversion circuit 13, and outputs the image data, which is stored therein, to the second output circuit 17 at predetermined timing. Further, the second image buffer 15 outputs a blanking signal, which is used for converting the image data at a predetermined address among the image data output from the first image buffer 14 into black data, to the first image buffer 14. Although described later in detail, the blanking signal is for preventing the projection image by the first projector 18 and the projection image by the second projector 19 from overlapping with each other.

The first output circuit 16 outputs the image data input from the first image buffer 14 to the first projector 18. The second output circuit 17 outputs the image data input from the second image buffer 15 to the second projector 19.

The first projector 18 projects the image, which corresponds to the image data (the image data converted into XGA) input from the first output circuit 16, on the screen SC. The second projector 19 projects the image, which corresponds to the image data (the image data corresponding to the XGA size) input from the second output circuit 17, on the screen SC as a projection window with a size half as large as the projection window of the first projector 18. Since the internal configurations of the first and second projectors 18, 19 are the same, the internal configuration will hereinafter be explained using the first projector 18 as a representative.

Figure 2:
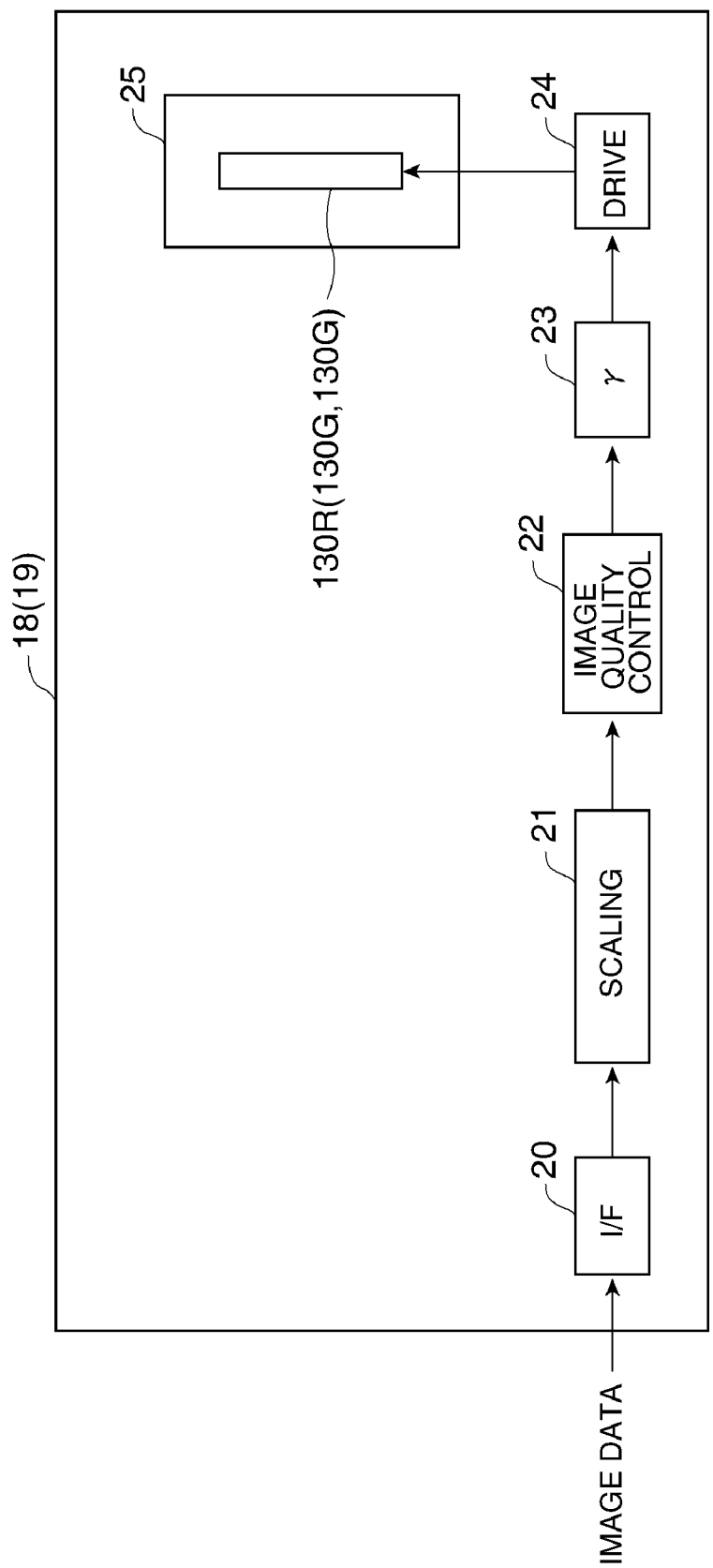
FIG. 2 is an internal configuration diagram of a first projector 18 in the display apparatus 1.

FIG. 2 is a block diagram representing the internal configuration of the first projector 18. As shown in FIG. 2, the first projector 18 is composed of an interface circuit 20, a scaling circuit 21, an image quality control circuit (an image quality control section) 22, a gamma adjustment circuit 23, a drive circuit 24, and an optical system 25. It should be noted that although it is composed of three systems of R, G, and B in reality, since all of the systems have the same configuration, the explanations will be presented illustrating only one of the systems in FIG. 2.

The interface circuit 20 assumes communication of the data between the first projector 18 and the output circuit 16, and outputs the image data input from the first output circuit 16 (the second output circuit 17 in the case with the second projector 19) to the scaling circuit 21.

The scaling circuit 21 has a function of converting the resolution of the image data input from the interface circuit 20 so as to correspond to the resolution of the liquid crystal light valve provided to the optical system 25, and a keystone distortion correction function for electrically correcting the keystone distortion caused by a mechanical factor of the optical system 25. The scaling circuit 21 outputs the image data, on which the resolution conversion and the keystone distortion correction described above have been executed, to the image quality control circuit 22. It should be noted that in the present embodiment, since it is assumed that the resolution of the liquid crystal light valve used therein is XGA, the resolution conversion is not executed in the scaling circuit 21.

The image quality control circuit 22 has a function of controlling the image quality such as brightness or contrast, and executes a brightness control process, a contrast control process, and so on on the image data input from the scaling circuit 21, and then outputs the image data, on which the image control has been executed, to the gamma adjustment circuit 23. The gamma adjustment circuit 23 executes gamma adjustment, which corresponds to an input signal-to-light modulation characteristic of the liquid crystal light valve, on the image data input from the image quality control circuit 22, and then outputs the image data, on which the gamma adjustment has been executed, to the drive circuit 24. The drive circuit 24 generates a drive signal for driving the liquid crystal light valve provided to the optical system 25, base on the image data input from the gamma adjustment circuit 23, and then outputs the drive signal to the liquid crystal light valve.

Figure 3:
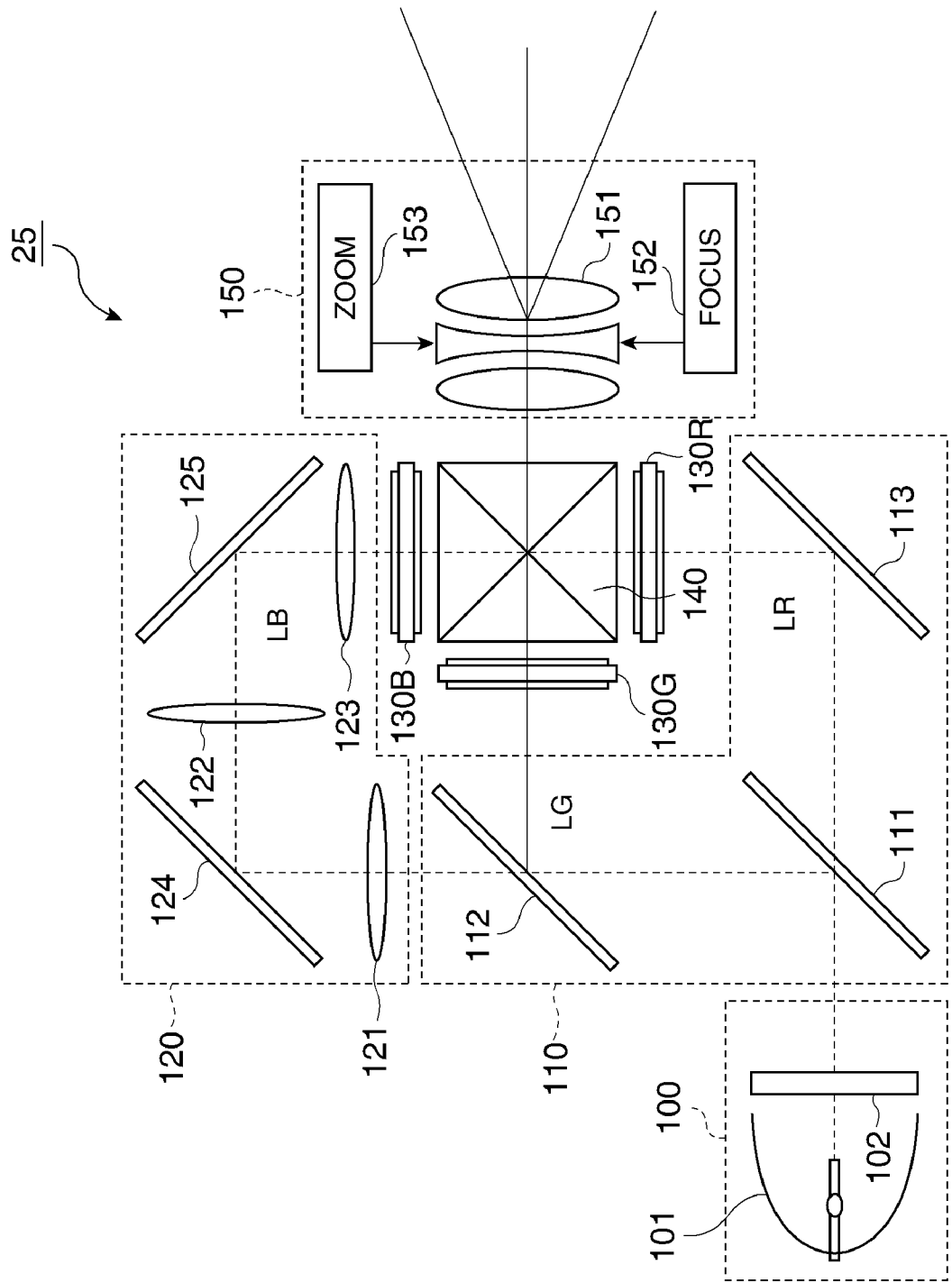
FIG. 3 is a detailed configuration diagram of an optical system 25 in the display apparatus 1.

FIG. 3 is a detailed configuration diagram of the optical system 25. As shown in FIG. 3, the optical system 25 is composed of an illumination optical system 100, a color separation optical system 110, a relay optical system 120, a red liquid crystal light valve 130R, a green liquid crystal light valve 130G, a blue liquid crystal light valve 130B, a cross dichroic prism 140, and a projection optical system 150.

The illumination optical system 100 is composed of a light source 101 and a polarization conversion element 102. The light source 101 is, for example, a super high-pressure mercury lamp, and emits white light including light spectrums of R, G, and B. The polarization conversion element 102 converts (polarizes) the polarization direction of the white light emitted from the light source 101 into a constant direction, and emits it to the color separation optical system 110.

The color separation optical system 110 is composed of dichroic mirrors 111, 112 and a reflecting mirror 113. The dichroic mirror 111 transmits the red light $L_R$ among the white light input from the illumination optical system 100, to the reflecting mirror 113, and at the same time, reflects the blue light and the green light toward the dichroic mirror 112.

The reflecting mirror 113 reflects the red light input from the dichroic mirror 111 toward the red liquid crystal light valve 130R. On the other hand, the dichroic mirror 112 reflects the green light $L_G$ among the blue light and the green light input from the dichroic mirror 111, toward the green liquid crystal light valve 130G, and at the same time, transmits the blue light $L_B$ to the relay optical system 120.

The relay optical system 120 is composed of relay lenses 121, 122, 123, and reflecting mirrors 124, 125. The blue light $L_B$ separated by the color separation optical system 110 is emitted toward the blue liquid crystal light valve 130B via the relay lens 121→ the reflecting mirror 124→ the relay lens 122→ the reflecting mirror 125→ the relay lens 123 in this order.

The red liquid crystal light valve 130R, the green liquid crystal light valve 130G, and the blue liquid crystal light valve 130B are driven by the drive signals supplied from the drive circuits 24 corresponding respectively thereto, modulate (execute intensity control on) the colored light (red light, green light, and blue light) input respectively thereto, and then output it to the cross dichroic prism 140. The cross dichroic prism 140 is obtained by bonding four rectangular prisms to each other with a dielectric multilayer film for reflecting the red light and a dielectric multilayer film for reflecting the blue light formed on the inner surface of the rectangular prisms so as to form a cross shape, and the three colored light beams are combined by the dielectric multilayer films, and emitted to the projection optical system 150 as light beams expressing a color image.

The projection optical system 150 is composed of a projection lens 151, an electric focus 152, and an electric zoom 153. The projection lens 151 enlargedly projects the combined light beam input from the cross dichroic prism 140 on the screen SC in accordance with the magnifying power (zoom ratio) controlled by the electric zoom 153. The electric focus 152 performs focus control of the projection lens 151 automatically or by a manual operation. The electric zoom (zoom control section) 153 controls the magnifying power of the size of the projection window by the projection lens 151 automatically or by a manual operation.

Here, mounting positions, zoom ratio, and focus of the respective projectors are controlled so that, with respect to the projection window W1 (a first window) of the first projector 18, the projection window W2 (a second window) of the second projector 19 is projected at the center of the projection window W1 and with a size half as large as the size of the projection window W1 in both of the horizontal and the vertical directions as shown in FIG. 4.

An operation of the display apparatus 1 having the configuration described above will hereinafter be explained.

Figure 5A:
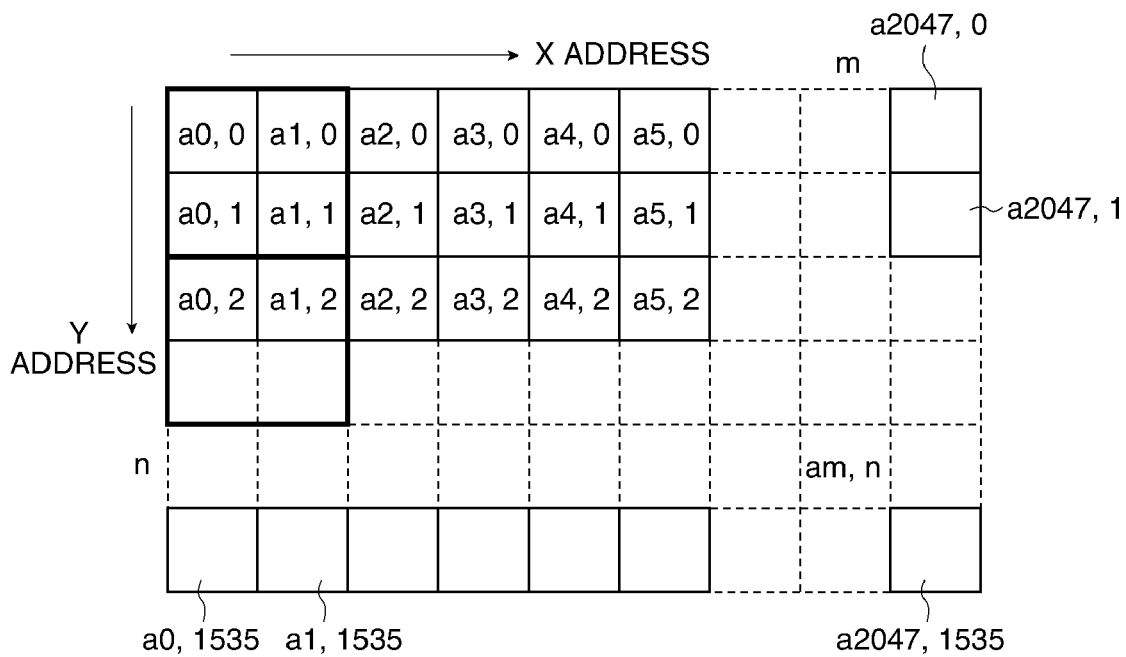
FIGS. 5A and 5B are first explanatory diagrams related to an operation of the display apparatus 1.

Firstly, the image signal input from the computer PC is converted into an image data by the A/D converter 10, and then written into the image memory 11 frame by frame. FIG. 5A shows the image data written in the image memory 11. As shown in FIG. 5A, the image data is divided into data each corresponding to one pixel, and stored in a memory area to which addresses "0" through "2047" in the X direction and addresses "0" through "1535" in the Y direction are assigned. It should be noted that "am, n" denotes the image data stored at the address (X, Y)=(m, n).

Figure 5B:
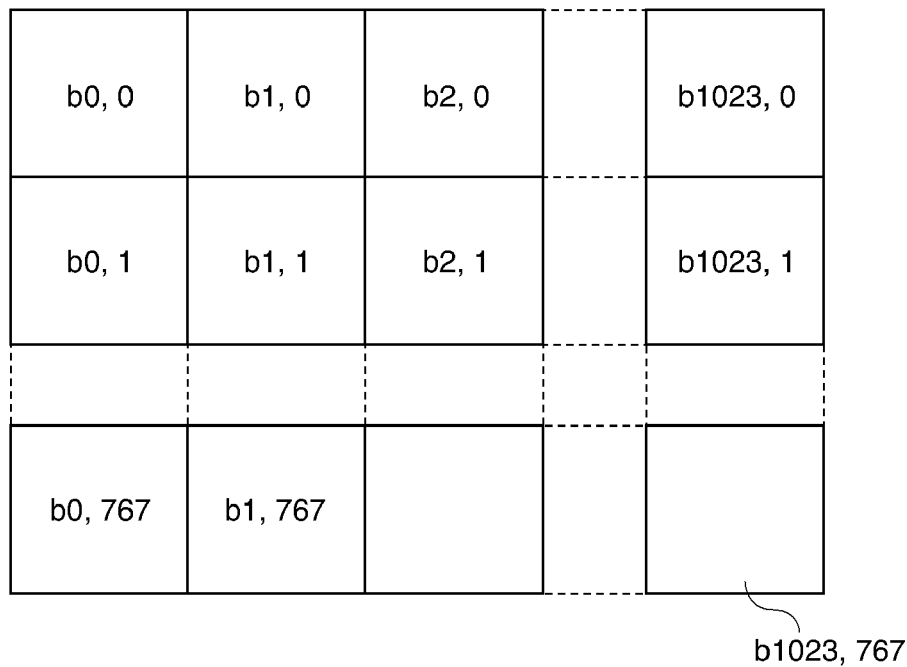

The image data thus stored in the image memory 11 is output to the first resolution conversion circuit 12 and the second resolution conversion circuit 13 frame by frame at predetermined timing. Then, the first resolution conversion circuit 12 converts the resolution (QXGA) of the image data input from the image memory 11 into XGA. Specifically, the first resolution conversion circuit 12 calculates an average value of the image data in every block of four pixels adjacent to each other as shown in FIG. 5A, thereby converting the blocks into the image data "b 0, 0" through "b 1023, 767" corresponding respectively to the pixels in XGA as shown in FIG. 5B. In other words, the image data "b0, 0" corresponding to the address (X, Y)=(0, 0) of XGA, for example, is calculated along the formula 1 described below.

$$"b0, 0" = \{"a0, 0" + "a1, 0" + "a0, 1" + "a1, 1"\}/4 \quad (1)$$

The image data thus converted to have a resolution of XGA by the first resolution conversion circuit 12 is stored in the first image buffer 14. Specifically, as shown in FIG. 5B, the image data thus converted into XGA is divided into data each corresponding to one pixel, and stored in a memory area of the first image buffer 14 to which addresses "0" through "1023" in the X direction and addresses "0" through "767" in the Y direction are assigned.

Figure 6A:
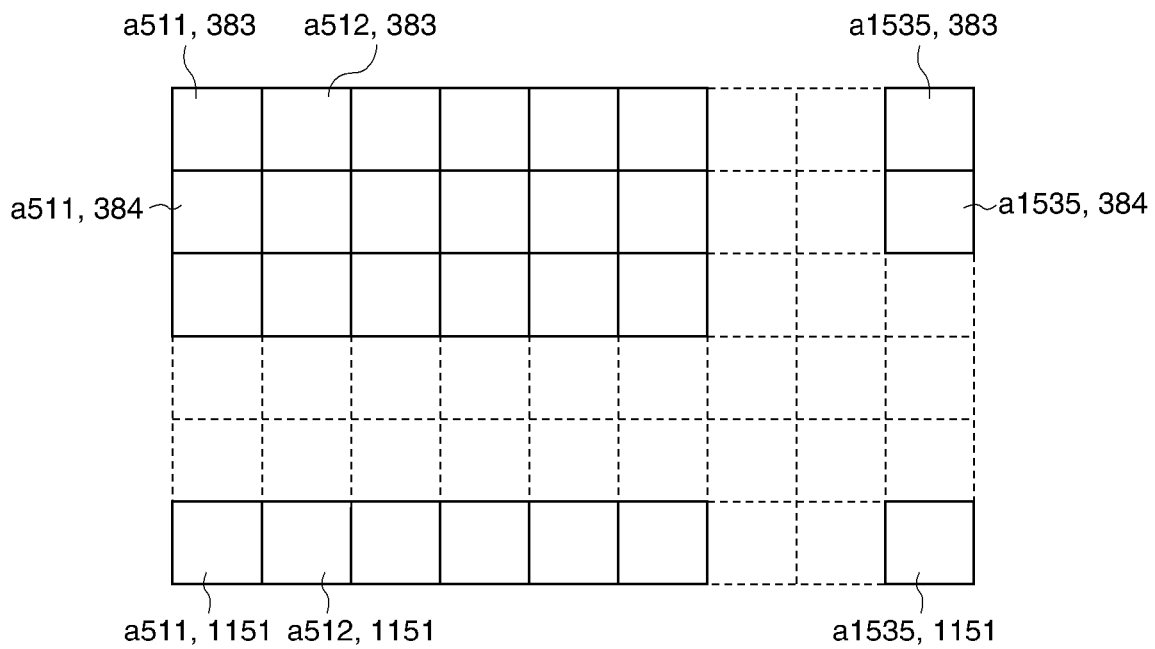
FIGS. 6A and 6B are second explanatory diagrams related to an operation of the display apparatus 1.

On the other hand, the second resolution conversion circuit 13 extracts the data in a range with a size (i.e., a half size) corresponding to XGA among the image data (QXGA) input from the image memory 11. Specifically, the second resolution conversion circuit 13 extracts the image data included in the range corresponding to the X address of "511" through "1535" and the Y address of "383" through "1151" among the image data, as shown in FIG. 6A.

Figure 6B:
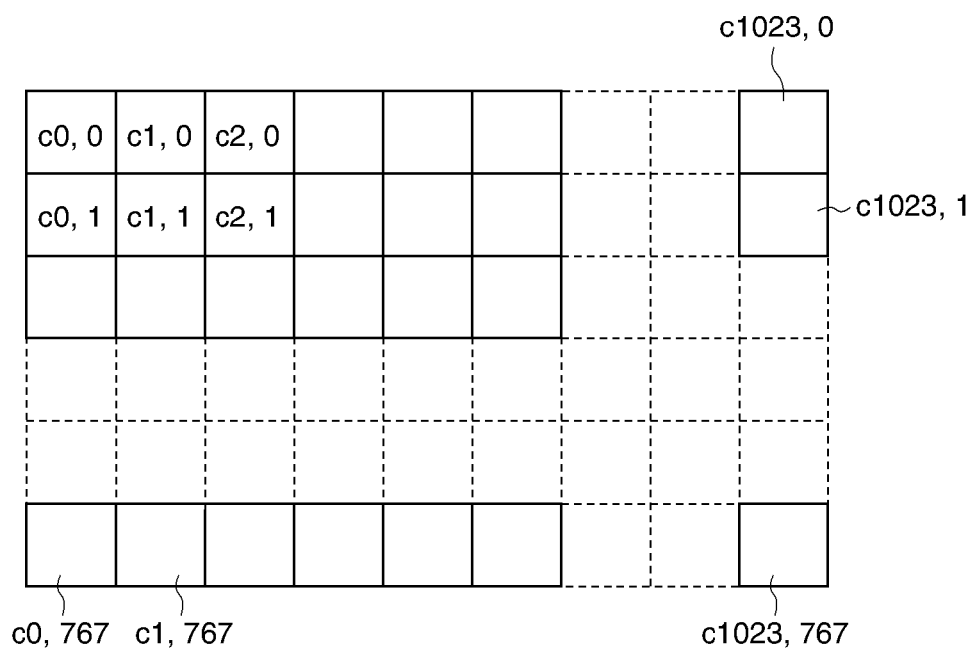

The image data thus extracted so as to have the size corresponding to XGA by the second resolution conversion circuit 13 is stored in the second image buffer 15. As shown in FIG. 6B, the image data thus extracted is divided into data each corresponding to one pixel, and stored in a memory area of the second image buffer 15 to which addresses "0" through "1023" in the X direction and addresses "0" through "767" in the Y direction are assigned. Specifically, here, only the address conversion is executed, and for example, the image data "a511, 383" is converted into the image data "c0, 0" corresponding to the address (X, Y)=(0, 0) of XGA, and the image data "a1535, 1151" is converted into the image data "c1023, 767" corresponding to the address (X, Y)=(1023, 767) of XGA.

As described above, the image data (the image data converted into XGA) stored in the first image buffer 14 is output to the first projector 18, and at the same time, the image data (the image data corresponding to the XGA size) stored in the second image buffer 15 is output to the second projector 19.

Figure 7:
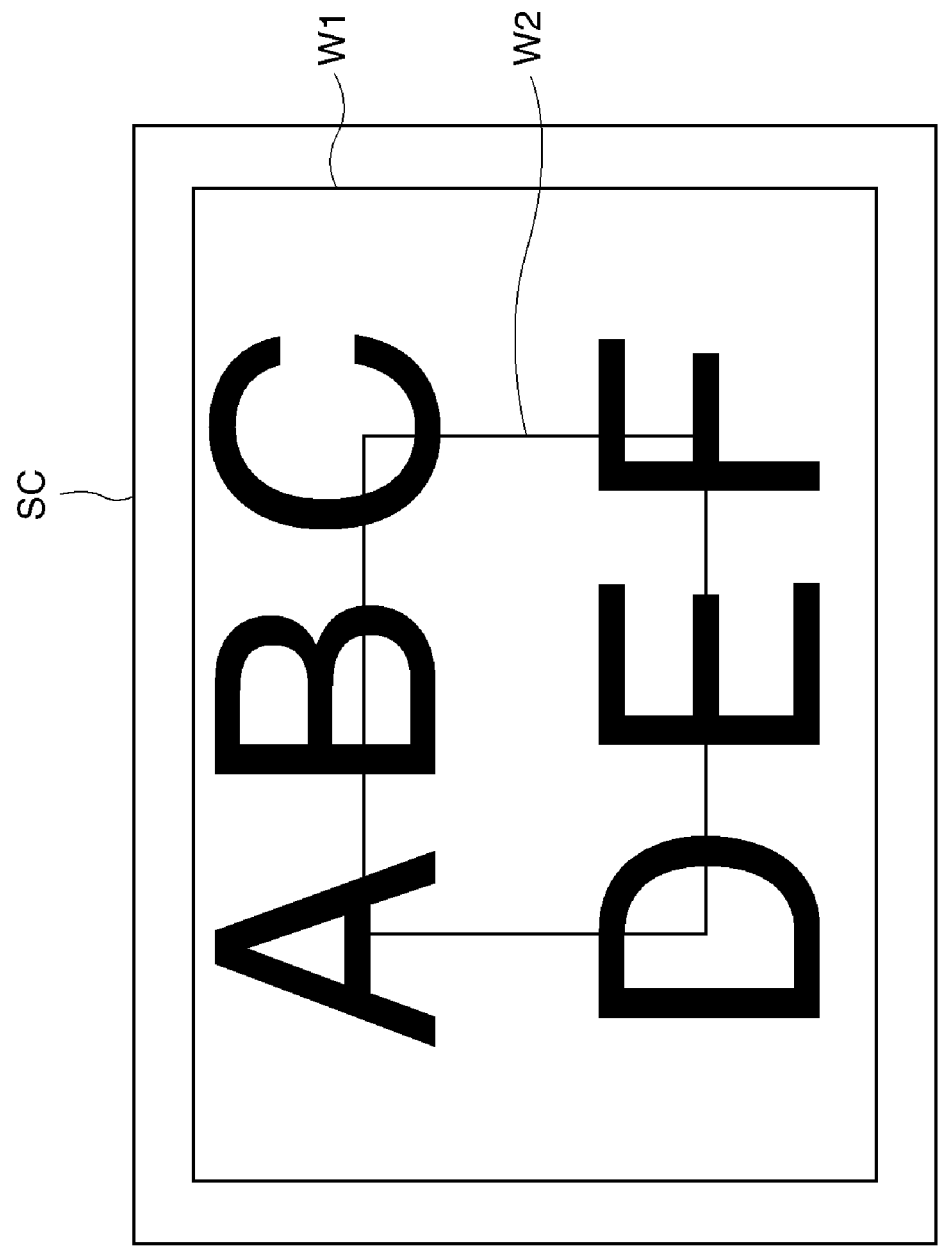
FIG. 7 is a diagram showing the projection windows W1 and W2 displayed on the screen SC by the display apparatus 1.

Thus, the first projector 18 projects the image corresponding to the image data converted into XGA on the screen SC, and at the same time, the second projector 19 projects the image corresponding to the image data equivalent to the XGA size on the screen SC. FIG. 7 is a diagram showing an example of the windows displayed on the screen SC. As shown in FIG. 7, with respect to the projection window W1 of the first projector 18, the projection window W2 of the second projector 19 is projected at the center thereof with a size half as large as the size of the projection window W1 in both of the horizontal and the vertical directions. In other words, in accordance with the input image signal (with a resolution of QXGA), display is performed in the range (the projection window W2) half as large as the screen in both of the vertical and lateral directions at the central section thereof directly with the resolution of the input image signal, while in the peripheral section (the projection window W1), display is performed with a half resolution (XGA) in both of the horizontal and vertical directions.

In general, since important information is often displayed near the center of the screen, it is often enough to display the central portion in detail (with a higher resolution) and display the peripheral portion roughly (with a lower resolution) as described above. As described above, according to the display apparatus 1 in the present first embodiment, it is possible to realize a desired characteristic at a relatively low cost compared to the case of displaying the whole with a high resolution as in the related art. In other words, since the observer gets away from the screen SC in the case of attempting to observe the whole at a time, it is not required to make the details visible in view of human eyesight, and further, since the observer gets closer to the screen SC in the case of observing the details, the range, which can be viewed in human eyesight at a time, becomes limited, and therefore, it is enough to make it possible to perform detailed display (high-resolution display) in part.

Further, since there is adopted the configuration in which blanking (display with black data) is provided to a part of the peripheral coarse projection window W1 corresponding to the high-resolution area at the center of the screen, there is no chance for the projection window W2 displaying the important information and the peripheral projection window W1 to overlap with each other even in the case in which, for example, the relative position between the first projector 18 and the second projector 19 is slightly shifted, thereby making it possible to prevent the degradation in the resolution of the projection image.

Further, since the liquid crystal light valves with the same resolution (pixel count) can be used in the two projectors (the first projector 18 and the second projector 19), the same model can commonly be used therein, and further, since it is enough to prepare a single unit of the same model as maintenance equipment, it is possible to achieve reduction of maintenance cost.

Second Embodiment

Then, a display apparatus according to a second embodiment of the invention will be explained. The second embodiment relates to a display apparatus capable of varying the size of the projection window W2 by the second projector 19 in accordance with the distance from the screen SC to the observer.

Figure 8:
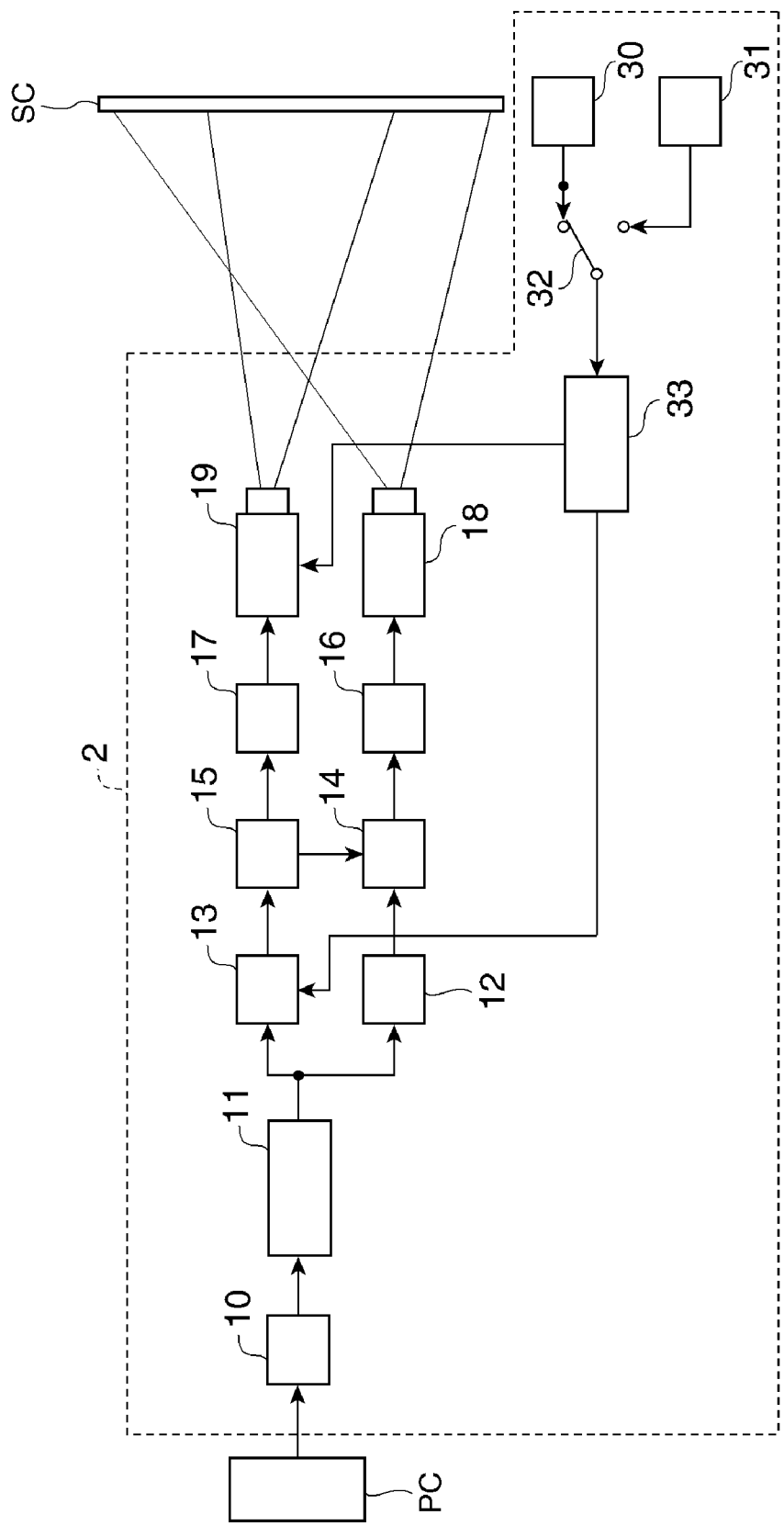
FIG. 8 is a schematic diagram of a configuration of a display apparatus 2 according to a second embodiment of the invention.

FIG. 8 is a schematic diagram of a configuration of the display apparatus 2 according to the second embodiment. It should be noted that in FIG. 8, substantially the same constituents as those shown in FIG. 1 (the first embodiment) are denoted with the same reference numerals, and the explanations therefor will be omitted. As shown in FIG. 8, the display apparatus 2 in the second embodiment is additionally provided with an observation distance measurement section 30, an observation distance manually setting section 31, a switching circuit 32, and a parameter generation section 33.

The observation distance measurement section 30 measures the distance d from the screen SC to the observer, and outputs an observation distance signal representing the measurement result to the switching circuit 32. As the observation distance measurement section 30, there can be used a distance measuring instrument known to the public, for example, for emitting an ultrasonic wave, an infrared ray, or the like toward the observer, and measuring the time until the emitted wave returns. The observation distance manually setting section 31 is for setting the observation distance by a manual operation, and outputs the observation distance signal corresponding to the setting value to the switching circuit 32.

The switching circuit 32 selects either one of the observation distance signals respectively input from the observation distance measurement section 30 and the observation distance manually setting section 31, and outputs the observation distance signal thus selected to the parameter generation section 33. It should be noted that although it is explained for the sake of convenience that the setting value of the observation distance manually setting section 31 is set to be the value corresponding to the observation distance, the value is not necessarily required to be faithful to the actual observation distance, but can arbitrarily be set while actually observing the display screen since the size of the projection window by the second projector 19 can be varied in the display apparatus 2 of the present second embodiment as described later.

The parameter generating section 33 generates an extraction range designation signal for designating a range of the data to be extracted from the image data (with a resolution of QXGA) stored in the image memory 11, a zoom signal for controlling the electric zoom 153 in the second projector 19, and an image quality control signal for controlling the image quality control circuit 22 in the second projector 19, based on the observation distance signal input from the switching circuit 32. The extraction range designation signal is output to the second resolution conversion circuit 13, the zoom signal is output to the electric zoom 153 in the second projector 19, and the image quality control signal is output to the image quality control circuit 22 in the second projector 19.

Figure 9:
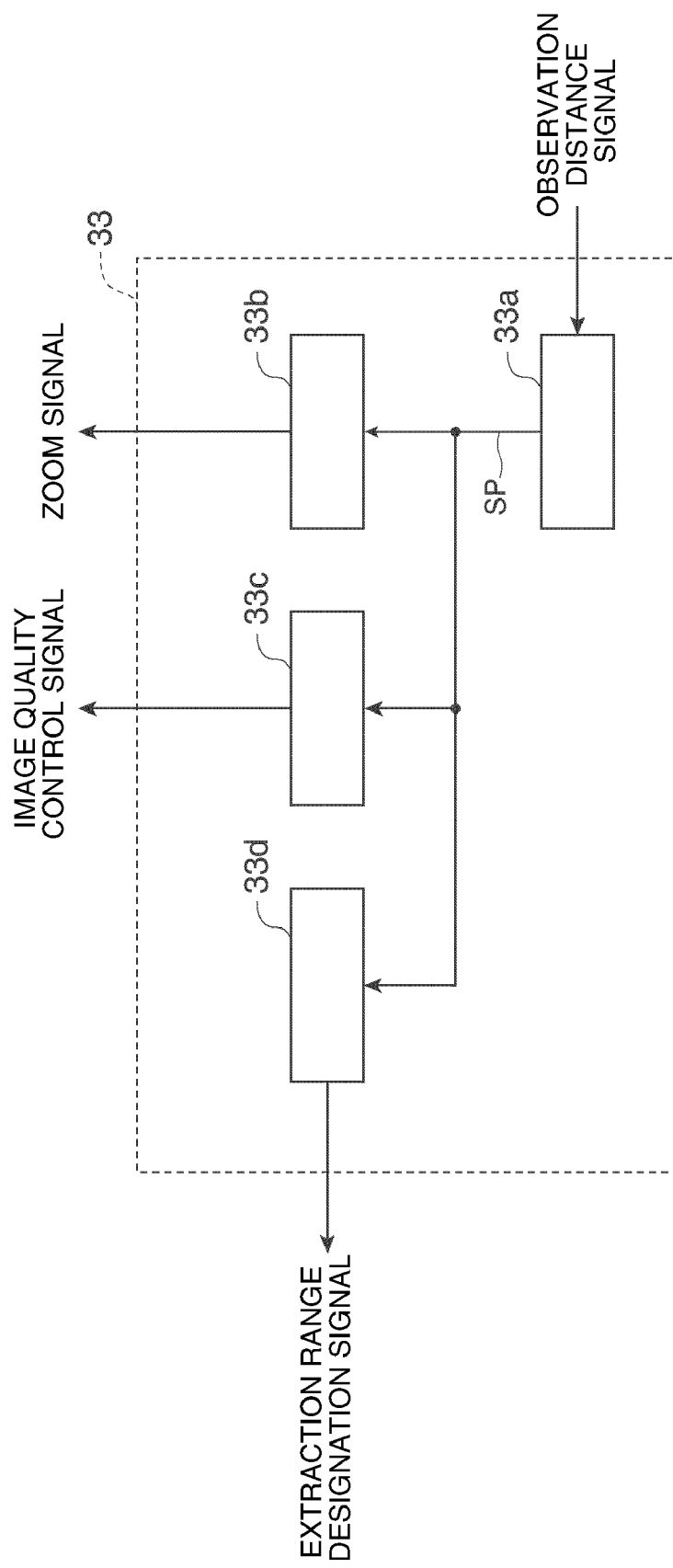
FIG. 9 is an internal configuration diagram of a parameter generation section 33 in the display apparatus 2.

FIG. 9 is a detailed configuration diagram of the parameter generation section 33. As shown in FIG. 9, the parameter generation section 33 is composed of a window size parameter generation section 33a, a zoom signal generation section 33b, an image quality control signal generation section 33c, and an extraction range generation section 33d.

As shown in FIG. 10A, the window size parameter generation section 33a obtains a window size parameter SP corresponding to the observation distance d represented by the observation distance signal input from the switching circuit based on the correspondence between the observation distance d and the window size parameter SP, and outputs the window size parameter SP thus obtained to the zoom signal generation section 33b, the image quality control signal generation section 33c, and the extraction range generation section 33d.

Here, the window size parameter SP is data for designating the size (window size) of the projection window W2 of the second projector 19. Since the size of the projection window W2 of the second projector 19 is determined in relation to the size of the projection window W1 of the first projector 18, the upper limit value SPmax of the window size parameter SP in FIG. 10A is set to be a value with which the size of the projection window W2 becomes the same as the size of the projection window W1 of the first projector 18, and the lower limit value SPmin thereof on the other hand is set to be a value with which the size of the projection window W2 becomes half as large as the size of the projection window W1 of the first projector 18. It should be noted that it is enough for these setting values to be determined in accordance with the image signal input from the computer PC, the relationship in resolution (pixel count) between the first projector 18 and the second projector 19, and further, the zoom ratio of the projection lens 151 of the second projector 19, and the setting values are not limited to the values described above. Further, although the value approximately proportional to the observation distance d is set between the upper limit value SPmax and the lower limit value SPmin, any simply increasing characteristic can actually be adopted.

As shown in FIG. 10B, the zoom signal generation section (zoom ratio setting section) 33b obtains the zoom ratio Zm corresponding to the window size parameter SP input from the window size parameter generation section 33a based on the correspondence between the zoom ration Zm and the window size parameter SP set previously, and generates the zoom signal corresponding to the zoom ratio Zm thus obtained to output it to the second projector 19. Since the zoom signal is for controlling the electric zoom 153 of the second projector 19 (i.e., for controlling the size of the projection window W2 of the second projector 19), the zoom ratio Zm is set to be proportional to the window size parameter SP or to monotonically increase between the upper limit value SPmax and the lower limit value SPmin of the window size parameter SP, as shown in FIG. 10B.

As shown in FIG. 10C, the image quality control signal generation section (image quality setting section) 33c obtains the image quality control parameter LP corresponding to the window size parameter SP input from the window size parameter generation section 33a based on the correspondence between the image quality control parameter LP and the window size parameter SP set previously, and generates the image quality control signal corresponding to the image quality control parameter LP thus obtained to output it to the second projector 19. It should be noted that in FIG. 10C, a brightness control parameter for controlling the brightness of the image is assumed as the image quality control parameter LP, and the image quality control parameter LP is set to have a characteristic inversely proportional to the window size parameter SP between the upper limit value SPmax and the lower limit value SPmin thereof.

Since the area of the window of the projector is proportional to the square of the size of the window, when reducing the size of the window while keeping the light output of the second projector 19 constant, the luminance of the window becomes higher in proportion to the square of the size of the window. For example, the luminance with a half size is four times as high as the original luminance. Therefore, by controlling the brightness with the characteristic as shown in FIG. 10C, it is possible to set the brightness of the projection window W2 of the second projector 19 to be approximately the same level as the brightness of the projection window W1 of the first projector 18 regardless of the size of the projection window W2, thereby preventing uncomfortable feeling. It should be noted that it is possible to set the brightness of the projection window W2 to be different from the brightness of the projection window W1, to set the level of the black area, and to vary an edge reinforcement characteristic in accordance with the selection and setting of the control object of the image quality, and it is enough to set them in accordance with the actual installation environment, the purpose of use, the preference of the observer, and so on.

As shown in FIG. 10D, the extraction range generation section (extraction range setting section) 33d obtains an extraction range parameter DP corresponding to the window size parameter SP input from the window size parameter generation section 33a based on the correspondence between the extraction range parameter DP and the window size parameter SP set previously, and generates the extraction range designation signal corresponding to the extraction range parameter DP thus obtained to output it to the second resolution conversion circuit 13.

As shown in FIG. 10D, the extraction range parameter DP (extraction range designation signal) is for designating the range of the data to be extracted from the image data (with the resolution of QXGA) stored in the image memory 11 (in other words, for designating the range of the image data to be actually displayed in the projection window W2 of the second projector 19), and therefore, is set so as to be proportional to the window size parameter SP or to monotonically increase between the upper limit value SPmax and the lower limit value SPmin of the window size parameter. Here, the extraction range parameter DP corresponding to the lower limit value SPmin of the window size parameter is set to be, for example, "0.5," and the extraction range parameter DP corresponding to the upper limit SPmax is set to be "1."

On the other hand, the electric zoom 153 of the second projector 19 in the present second embodiment controls the zoom ratio Zm of the projection lens 151 based on the zoom signal input from the parameter generation section 33 (the zoom signal generation section 33b) described above. Further, the image quality control circuit 22 of the second projector 19 executes the image quality (brightness) control process on the image data input from the scaling circuit 21 based on the image quality control signal input from the parameter generation section 33 (the image quality control signal generation section 33c), and then outputs the image data on which the image quality control is executed to the gamma adjustment circuit 23. Further, the second resolution conversion circuit 13 in the present second embodiment executes extraction of the data in the designated range among the image data (with the resolution of QXGA) input from the image memory 11 based on the extraction range designation signal input from the parameter generation section 33 (the extraction range generation section 33d), and the process of converting the resolution according to needs.

An operation of the present display apparatus 2 having the configuration described above will hereinafter be explained.

Firstly, the operation is the same as in the first embodiment in that the image signal input from the computer PC is converted by the A/D converter 10 into the image data, then written in the image memory 11 frame by frame, and output to the first resolution conversion circuit 12 and the second resolution conversion circuit 13 frame by frame at predetermined timing. In contrast, in the operation of the present display apparatus 2, the observation distance measurement section 30 continuously measures the distance from the screen SC to the observer, and the observation distance signal representing the measurement result (observation distance d) is output to the switching circuit 32. Here, it is assumed that the switching circuit 32 selects the observation distance signal of the observation distance measurement section 30, and then outputs it to the parameter generation section 33.

The window size parameter generation section 33a in the parameter generation section 33 obtains the window size parameter SP corresponding to the observation distance d represented by the observation distance signal input from the switching circuit 32 based on the characteristic data shown in FIG. 10A. For example, the shorter the observation distance d is (the closer to the screen SC the observer is located), the closer to the lower limit value SPmin the window size parameter SP gets, thus the window size parameter SP becomes to have a value with which the size of the projection window W2 of the second projector 19 becomes smaller (half as large as the size of the projection window W1 at a minimum). On the other hand, the longer the observation distance d is (the further to the screen SC the observer is located), the closer to the upper limit value SPmax the window size parameter SP gets, thus the window size parameter SP becomes to have a value with which the size of the projection window W2 of the second projector 19 becomes larger (the same size as the size of the projection window W1 at a maximum).

Further, the zoom signal generation section 33b obtains the zoom ratio Zm corresponding to the window size parameter SP based on the characteristic data shown in FIG. 10B, and generates the zoom signal corresponding to the zoom ratio Zm thus obtained to output it to the second projector 19. For example, in the case in which the window size parameter SP takes the lower limit value SPmin, the zoom ratio Zm with which the size of the projection window W2 of the second projector 19 is set to be half as large as the size of the projection window W1 of the first projector 18 is obtained. Meanwhile, in the case in which the window size parameter SP takes the upper limit value SPmax, the zoom ratio Zm with which the size of the projection window W2 of the second projector 19 is set to be the same as the size of the projection window W1 of the first projector 18 is obtained.

Further, the image quality control signal generation section 33c obtains the image quality control parameter LP corresponding to the window size parameter SP based on the characteristic data shown in FIG. 10C, and generates the image quality control signal corresponding to the image quality control parameter LP thus obtained to output it to the second projector 19. For example, in the case in which the window size parameter SP takes the lower limit value SPmin (the case in which the size of the projection window W2 of the second projector 19 is the smallest), the image quality control parameter LP with which the brightness of the projection window W2 of the second projector 19 is set to be the lowest is obtained. Meanwhile, in the case in which the window size parameter SP takes the upper limit value SPmax (the case in which the size of the projection window W2 of the second projector 19 is the largest), the image quality control parameter LP with which the brightness of the projection window W2 of the second projector 19 is set to be the highest is obtained.

Further, the extraction range generation section 33d obtains the extraction range parameter DP corresponding to the window size parameter SP based on the characteristic data shown in FIG. 10D, and generates the extraction range designation signal corresponding to the extraction range parameter DP thus obtained to output it to the second resolution conversion circuit 13. In the case in which the window size parameter SP takes the lower limit value SPmin, for example, the extraction range parameter DP ("0.5"), with which the data extraction range is designated to be the size (XGA size) half as large as the size of the image data (with the resolution of QXGA) stored in the image memory 11, is obtained similarly to the case of the first embodiment. Meanwhile, in the case in which the window size parameter SP takes the upper limit value SPmax, the extraction range parameter DP ("1"), with which the range of the data to be extracted from the image data (with the resolution of QXGA) stored in the image memory 11 is designated to be the overall range thereof, is obtained.

Meanwhile, the first resolution conversion circuit 12 converts the resolution (QXGA) of the image data input from the image memory 11 into XGA, and the image data thus converted is stored in the first image buffer 14. Such operations are the same as in the first embodiment, and therefore, detailed explanations therefor will be omitted.

On the other hand, the second resolution conversion circuit 13 extracts the data included in the extraction range thus designated among the image data (QXGA) input from the image memory 11 based on the extraction range designation signal input from the parameter generation section 33 (the extraction range generation section 33d). Specifically, in the case with the extraction range designation signal representing the extraction range parameter DP="0.5," the second resolution conversion circuit 13 extracts the data in a range with a size (i.e., a half size) corresponding to XGA among the image data (QXGA) input from the image memory 11, similarly to the case of the first embodiment. Further, in the case with the extraction range designation signal representing the extraction range parameter DP="1," the second resolution conversion circuit 13 executes the same process as the resolution conversion process by the first resolution conversion circuit 12 (specifically, the resolution (QXGA) of the image data input from the image memory 11 is converted into XGA).

Here, an operation of the second resolution conversion circuit 13 in the case in which the extraction range parameter DP takes a value between "1" and "0.5" will be explained with reference to the flowchart shown in FIG. 11. It should be noted that the explanations will hereinafter presented assuming the operation with the extraction range parameter DP of "0.75," namely, the operation of extracting the data included in the range with a size corresponding to ¾ at the center thereof among the image data (QXGA) input from the image memory 11, and then converting it to have a resolution of XGA.

Figure 11:
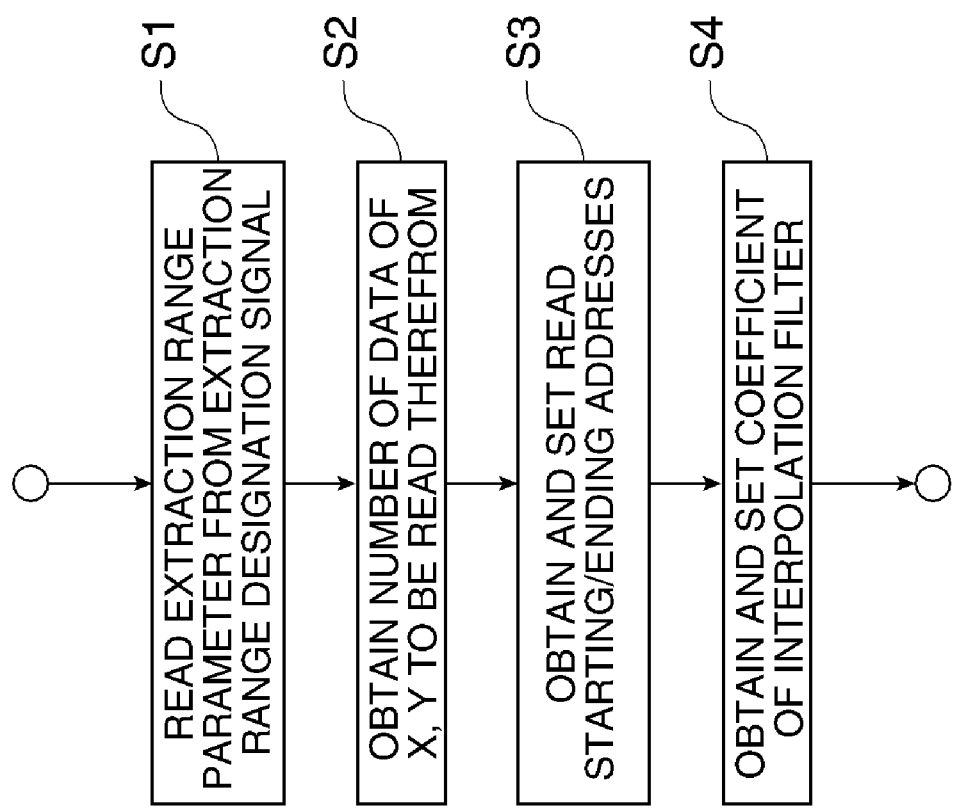
FIG. 11 is a first explanatory diagram related to an operation of the display apparatus 2.

As shown in FIG. 11, the second resolution conversion circuit 13 firstly reads the extraction range parameter DP ("0.75" here) from the extraction range designation signal input therein (step S1). Then, the second resolution conversion circuit 13 determines the number of data to be extracted from the image memory 103 in each of the X address direction and the Y address direction (step S2). Here, since the extraction range parameter DP="0.75" is assumed, the number of data in the X address direction becomes 2048×0.75=1536, and the number of data in the Y address direction becomes 1536×0.75=1153.

Subsequently, the second resolution conversion circuit 13 determines the read starting address and the read ending address of the extraction data (step S3). Specifically, taking the fact that the center of the extraction range is identical to the center of the overall range of the image and the address starts from "0" into consideration, the read starting and ending addresses in the X direction and the read starting and ending addresses in the Y direction are obtained as follows.

Read starting address in the X direction: (2048−1536)/2=256

Read ending address in the X direction: 256+1536−1=1792

Read starting address in the Y direction: (1536−1153)/2=191.5→192

Read ending address in the Y direction: 192+1153−1=1344

Figure 12A:
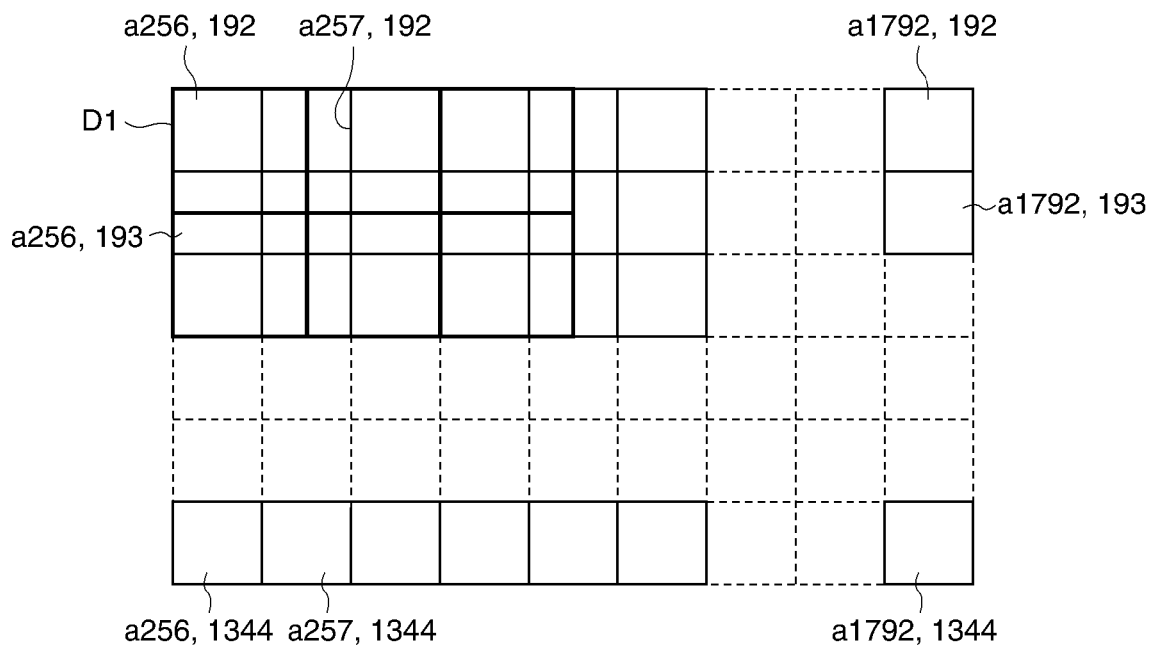
FIGS. 12A and 12B are second explanatory diagrams related to an operation of the display apparatus 2.

Then, the second resolution conversion circuit 13 extracts the data included in the extraction range indicated by the read starting and ending addresses in the X direction and the read starting and ending addresses in the Y direction thus determined as described above, and converts the image data, thus extracted, to have a resolution of XGA using an interpolation calculation (step S4). The resolution conversion process will be explained with reference to FIGS. 12A and 12B. FIG. 12A shows the data "a256, 192" through "a1792, z1344" included in the extraction range indicated by the addresses described above.

Here, in order for converting the number of data 1536 in the X address direction into the number of data 1024 of XGA, it is enough to execute the conversion of multiplication by ⅔ (the same can be applied to the Y direction). In other words, as shown in FIG. 12A, it is enough to convert the data of each pixel into the data in the area corresponding to the thick frame D1 by the interpolation calculation. Specifically, interpolation coefficients corresponding respectively to the four pixels adjacent to each other are set, and the interpolation coefficients are multiplied by the data of the respective pixels to calculate the average value, thereby obtaining the image data "d0, 0" through "d1023, 767" corresponding to the respective pixels of XGA. For example, the image data "d0, 0" corresponding to the address (X, Y)=(0, 0) can be calculated along the formula 2 described below.

"d0, 0"={"a256, 192"·4+"a257, 192"·2+"a256, 193"·2+"a257, 193"}/9     (2)

Figure 12B:
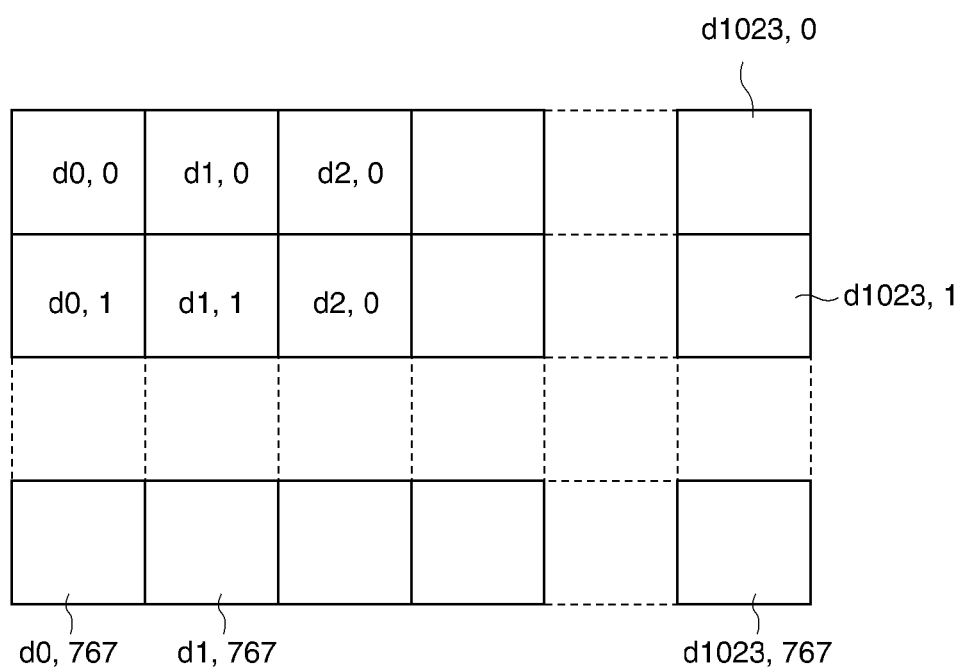

The image data (the resolution conversion is executed in the case in which the extraction range parameter DP takes a value other than "0.5") thus extracted and converted to have a resolution of XGA by the second resolution conversion circuit 13 is stored in the second image buffer 15. Specifically, as shown in FIG. 12B, the image data thus converted into XGA is divided into data each corresponding to one pixel, and stored in a memory area of the second image buffer 15 to which addresses "0" through "1023" in the X direction and addresses "0" through "767" in the Y direction are assigned.

It should be noted that although the extraction range parameter DP can take any value between "0.5" and "1" in reality, a known method such as a bicubic method can be used as the interpolation calculation process besides the linear interpolation method in which the area of the pixel or the center of the pixel is taken as a representative point, and the interpolation coefficient corresponding to the distance between the pixels is set as described above.

The image data stored in the first image buffer 14 as described above is output to the first projector 18, and thus, the image corresponding to the image data converted into XGA is projected on the screen SC by the first projector 18. This point is substantially the same as in the first embodiment. Meanwhile, the image data stored in the second image buffer 15 is output to the second projector 19, and thus, the image corresponding to the image data converted into XGA is projected on the screen SC by the second projector 19. On this occasion, the size and the brightness of the projection window W2 thereof are controlled by the zoom signal and the image quality control signal generated in the parameter generation section 33.

For example, as described above, in the case in which the window size parameter SP takes the lower limit value SPmin, since the zoom ratio Zm with which the size of the projection window W2 of the second projector 19 is set to be half as large as the size of the projection window W1 of the first projector 18 is selected, on this occasion, the projection window W2 is displayed with the size half as large as the size of the projection window W1 by the control of the electric zoom 153 (similarly to the case of the first embodiment, see FIG. 7). Further, in the case in which the window size parameter SP takes the lower limit value SPmin, since the image quality control parameter LP with which the brightness of the projection window W2 of the second projector 19 becomes the lowest is selected, on this occasion, the brightness of the projection window W2 is controlled to be the lowest by the image quality control process of the image quality control circuit 22.

Further, in the case in which the window size parameter SP takes the upper limit value SPmax, since the zoom ratio Zm with which the size of the projection window W2 of the second projector 19 is set to be the same as the size of the projection window W1 of the first projector 18 is selected, on this occasion, the projection window W2 is displayed with the same size as the projection window W1. Further, in the case in which the window size parameter SP takes the upper limit value SPmax, since the image quality control parameter LP with which the brightness of the projection window W2 of the second projector 19 becomes the highest is selected, on this occasion, the brightness of the projection window W2 is controlled to be the highest. It should be noted that as described above, in the case in which the window size parameter SP takes the upper limit value SPmax, although it is assumed that the first projector 18 and the second projector 19 display substantially the same windows, since the projection window W1 of the first projector 18 is set to be black by the blanking signal described in the first embodiment, degradation in image quality due to the overlap between the projection windows can be prevented.

Obviously, in the case in which the window size parameter SP takes neither of the upper limit value SPmax and the lower limit value SPmin (e.g., the case in which the extraction range parameter DP takes "0.75" as described above), the projection window W2 should be displayed with the size, the brightness, and the resolution corresponding to the window size parameter SP.

As described above, according to the display apparatus 2 in the present second embodiment, since the size of the projection window W2 of the second projector 19 can be varied in accordance with the observation distance d, and at the same time, the extraction range of the image data to be displayed in the projection window W2 is varied in accordance with the observation distance d, it is possible to continue display without varying the size of the object displayed in the projection window W2. Therefore, it is possible to set the projection window W2 to be smaller to display the image near the center thereof with the resolution of the input image signal in the case of making observation from a position close to the screen, and to display the image with the display resolution lowered in accordance the observation distance d so as to correspond to the resolution of the eyesight while keeping the apparent view angle approximately constant by enlarging the projection window W2 in accordance with the distance in the case of making observation from a position away from the screen. Further, since the projection window W1 of the first projector 18 is displayed constantly, it is possible to make observation from a position close to the screen if it is desired to view the details while constantly grasping the overall picture.

Third Embodiment

Then, a display apparatus according to a third embodiment of the invention will be explained. In the first and the second embodiments described above, there is explained the case of displaying the projection window W2 of the second projector 19 at the center of the projection window W1 of the first projector 18, namely the case in which the centers of the projection windows W1, W2 are constantly the same. In contrast, the present third embodiment relates to a display apparatus capable of controlling the display position of the projection window W2 in accordance with the location of the observer with respect to the inside of the surface of the screen SC.

Figure 13:
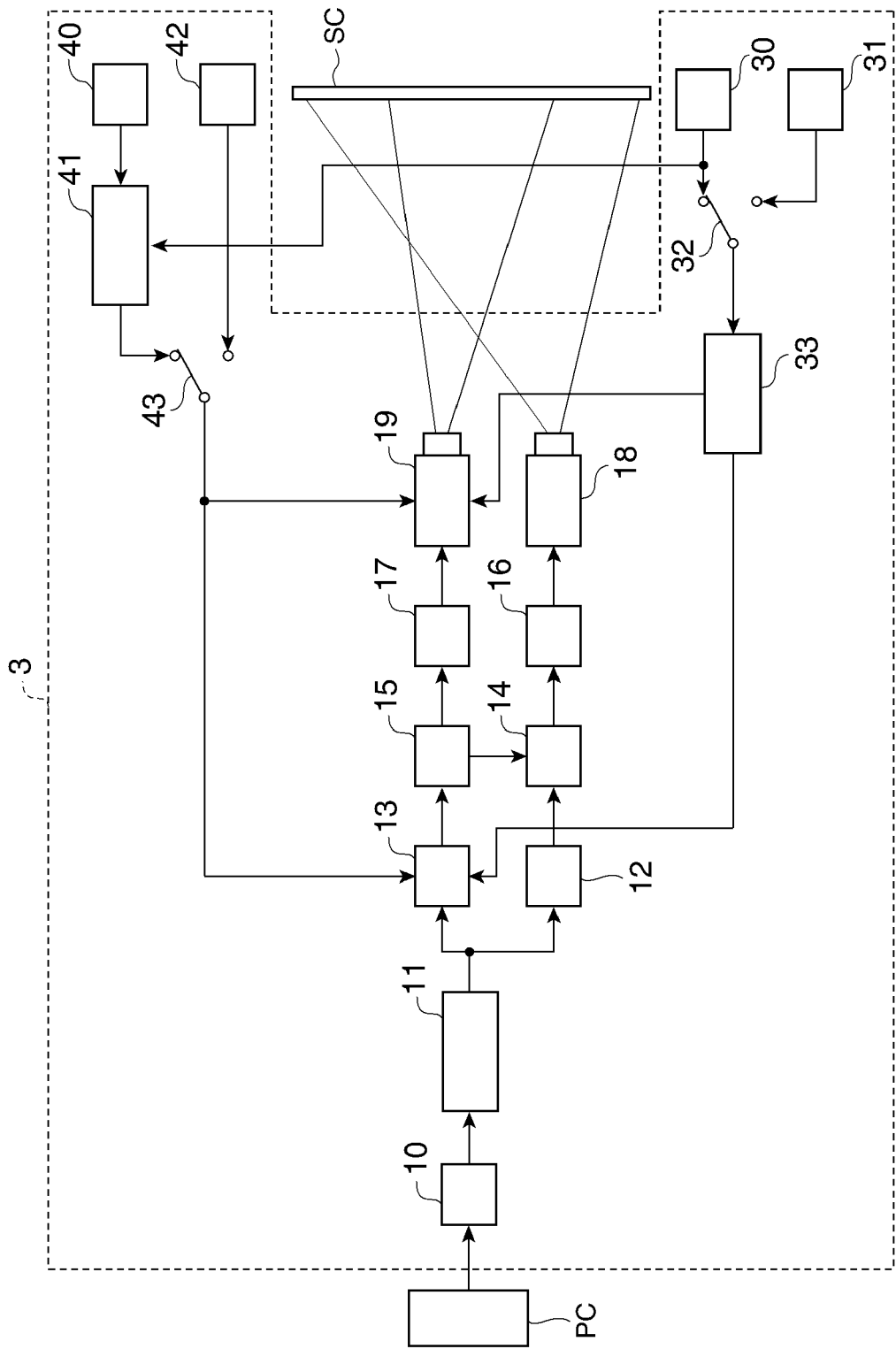
FIG. 13 is a schematic diagram of a configuration of a display apparatus 3 according to a third embodiment of the invention.

FIG. 13 is a schematic diagram of a configuration of the display apparatus 3 according to the third embodiment. It should be noted that in FIG. 13, substantially the same constituents as those shown in FIG. 1 or FIG. 8 are denoted with the same reference numerals, and the explanations therefor will be omitted. As shown in FIG. 13, the display apparatus 3 in the third embodiment is additionally provided with an observation location detection section 40, a display position parameter generation section 41, an observation location manually setting section 42, and a switching circuit 43.

The observation location detection section 40 detects the location of the observer in a plane parallel to the screen SC with respect to the screen SC, and outputs an observation location signal representing the detection result to the display position parameter generation section 41. It should be noted that in the case in which the projection window W1 of the first projector 18 is shifted with respect to the screen SC, the observation location can also be obtained as a location with respect to the projection window W1.

Figure 14A:
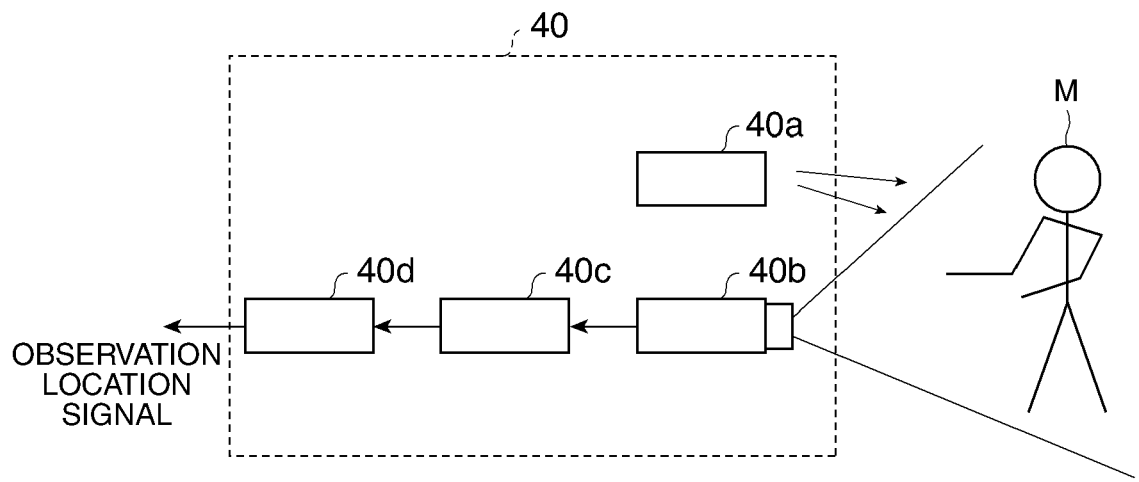
FIGS. 14A and 14B are internal configuration diagrams of an observation location detection section 40 in the display apparatus 3.

FIG. 14A shows a configuration example of the observation location detection section 40. As shown in FIG. 14A, the observation location detection section 40 is composed of an infrared projection section 40a, an infrared camera 40b, an image processing section 40c, and a location determination section 40d.

Figure 14B:
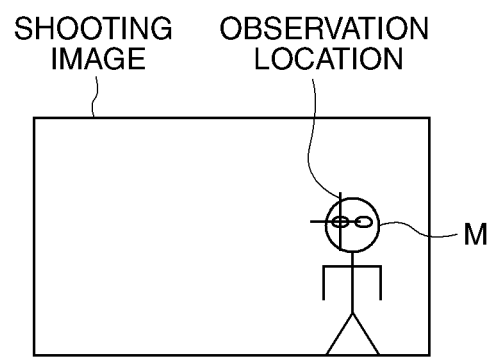

The infrared projection section 40a emits an infrared ray with an infrared light emitting diode or the like to illuminate the observer M. The infrared camera 40b takes a picture of the observer M and the peripheral area, and outputs image data representing the shooting image to the image processing section 40c. FIG. 14B is a schematic diagram showing the shooting image taken by the infrared camera 40b. As shown in FIG. 14B, the observer M viewed from the screen SC side shows up in the shooting image.

The image processing section 40c executes predetermined image processing (e.g., background elimination and binarization process) based on the image data input from the infrared camera 40b, and outputs the image data on which the binarization process has been executed to the location determination section 40d. The location determination section 40d detects the location of the eyes of the observer M based on the image data input from the image processing section 40c to determine the location as the observation location of the observer M, and outputs the observation location signal representing the observation location with two-dimensional coordinates to the display position parameter generation section 41.

The display position parameter generation section 41 outputs a position designation signal for designating the position of the extraction range of the image data in the second resolution conversion circuit 13 and the display position of the projection window W2 of the second projector 19 to the switching circuit 43 based on the observation location signal input from the observation location detection section 40 (the location determination section 40d). It should be noted that since the observation location signal input from the observation location detection section 40 only contains the information as the angle viewed from the infrared camera 40b, the location opposed right to the screen SC varies depending on the observation distance even if the observation locations are the same. Therefore, in the present embodiment, there is adopted a configuration in which the observation distance signal is input from the observation distance measurement section 30 to the display position parameter generation section 41, thereby correcting the observation location in accordance with the observation distance, thus the location opposed right to the screen SC can be grasped.

The observation location manually setting section 42 is for setting the observation location by a manual operation, and outputs the observation location signal corresponding to the setting value to the switching circuit 43. The switching circuit 43 selects either one of the location designation signals input respectively from the display position parameter generation section 41 and the observation location manually setting section 42, and outputs the selected one to the second resolution conversion circuit 13 and the second projector 19.

Figure 15:
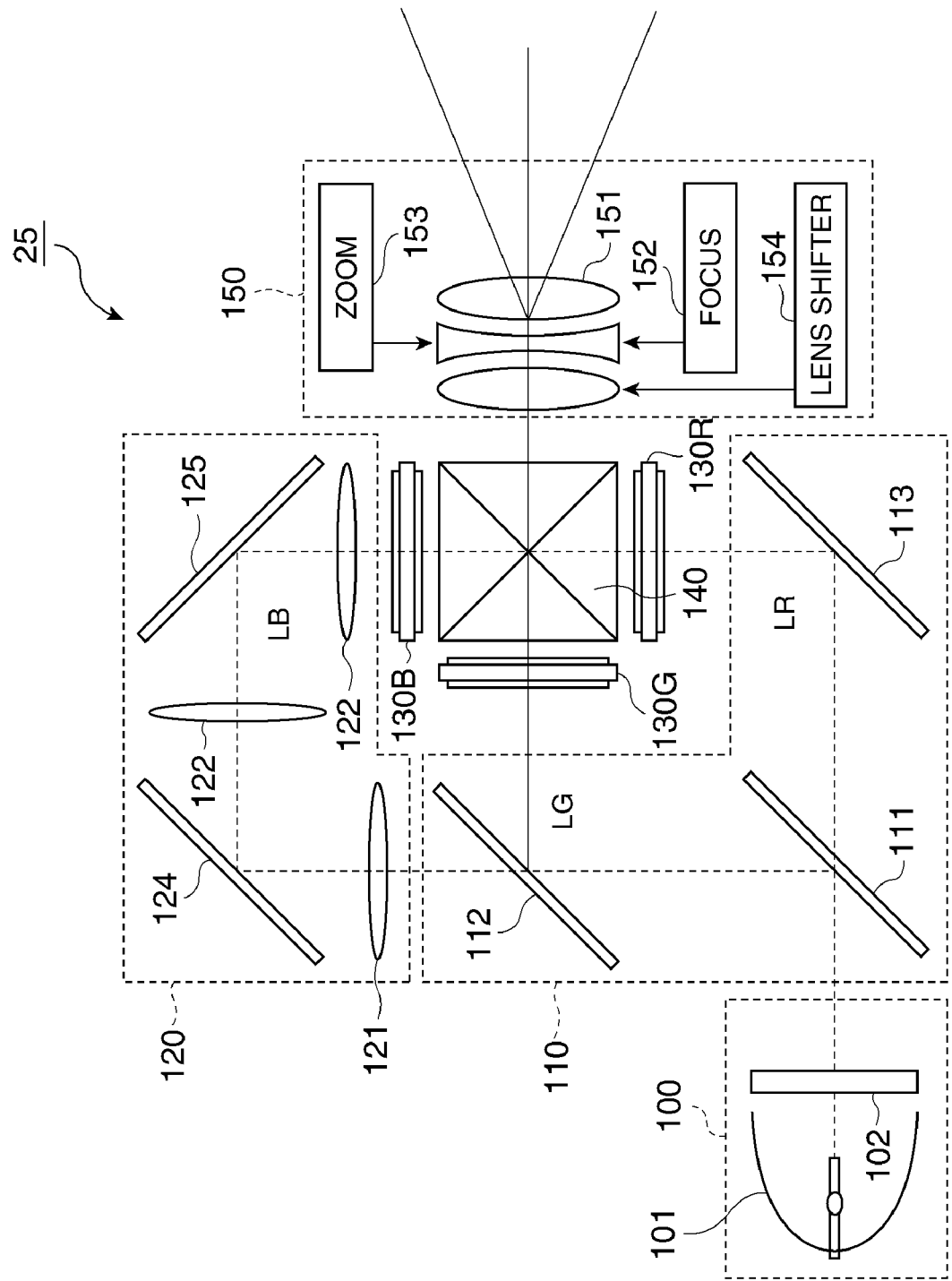
FIG. 15 is a detailed configuration diagram of an optical system 25 in the display apparatus 3.

Meanwhile, as shown in FIG. 15, the projection optical system 150 of the optical system 25 in the second projector 19 according to the present third embodiment is provided with an electric lens shifter (a display position control section) 154 to form a configuration in which the display position of the projection window W2 on the screen SC can be moved in parallel in the horizontal direction and the vertical direction by moving the optical axis of the projection lens 151 in parallel with respect to the exit optical axis of the cross dichroic prism 140. In other words, the electric lens shifter 154 performs control of the display position of the projection window W2 corresponding to the position designation signal described above.

Further, the second resolution conversion circuit 13 in the present third embodiment, similarly to the case of the second embodiment, has the function of controlling the position of the extraction range based on the position designation signal described above in addition to the function of performing the process of extracting the data in the designated range from the image data (with the resolution of QXGA) input from the image memory 11 based on the extraction range designation signal input from the parameter generation section 33, and the process of converting the resolution according to needs.

An operation of the display apparatus 3 in the present third embodiment having the configuration described above will hereinafter be explained. It should be noted that hereinafter the explanations of the operation substantially the same as in the second embodiment will be omitted, and the explanations will be presented focusing attention on distinguishing operations in the present third embodiment.

During the operation of the present display device 3, the observation location detection section 40 continuously detects the observation location of the observer M with respect to the screen SC, the display position parameter generation section 41 outputs the position designation signal to the second resolution conversion circuit 13 and the second projector 19. It should be noted that it is assumed that the switching circuit 43 selects the position designation signal of the position parameter generation section 41.

Hereinafter, an operation of the second resolution conversion circuit 13 will be explained. Since the operation of the second resolution conversion circuit 13 in the third embodiment is the same as the operation of the flowchart shown in FIG. 11 explained as the second embodiment except the step S3, the explanations will hereinafter be presented focusing attention on the step S3.

In the step S3, the second resolution conversion circuit 13 determines the read starting address and the read ending address of the extraction data.

Specifically, the second resolution conversion circuit 13 determines the read starting address and the read ending address based on the position designation signal. Assuming that the position designation signal contains P, Q values (display position parameters) corresponding to the reading address of X, Y, taking the center of the screen SC or the center of the projection window W1 of the first projector 18 as the origin, it is enough to provide bias to the address with these display position parameters.

Specifically, assuming that the extraction range parameter DP takes "0.75" similarly to the second embodiment, the read starting and ending addresses in the X direction and the read starting and ending addresses in the Y direction are obtained as follows.

Read starting address in the X direction: (2048−1536)/2+ P=256+P

Read ending address in the X direction: 256+1536−1+ P=1792+P

Read starting address in the Y direction: (1536−1153)/2+ Q=192+Q

Read ending address in the Y direction: 192+1153−1+ Q=1344+Q

It should be noted that since reading is performed in the memory area with no data in the case in which the address becomes negative or larger than the address of the image data stored in the image memory 11, it is enough to set the address to be "0" or the maximum address of the image data in that case.

By setting the range indicated by the read starting and ending addresses in the X direction and the read starting and ending addresses in the Y direction determined as described above as the extraction range of the data, the data (in other words, the data to be displayed in the projection window W2 of the second projector 19 with the display position controlled in accordance with the observation location) corresponding to the observation location of the observer M can be extracted.

On the other hand, the electric lens shifter 154 in the second projector 19 moves the optical axis of the projection lens 151 in parallel in accordance with the position designation signal, thereby controlling the display position of the projection window W2 of the second projector 19 on the screen SC.

Figure 16:
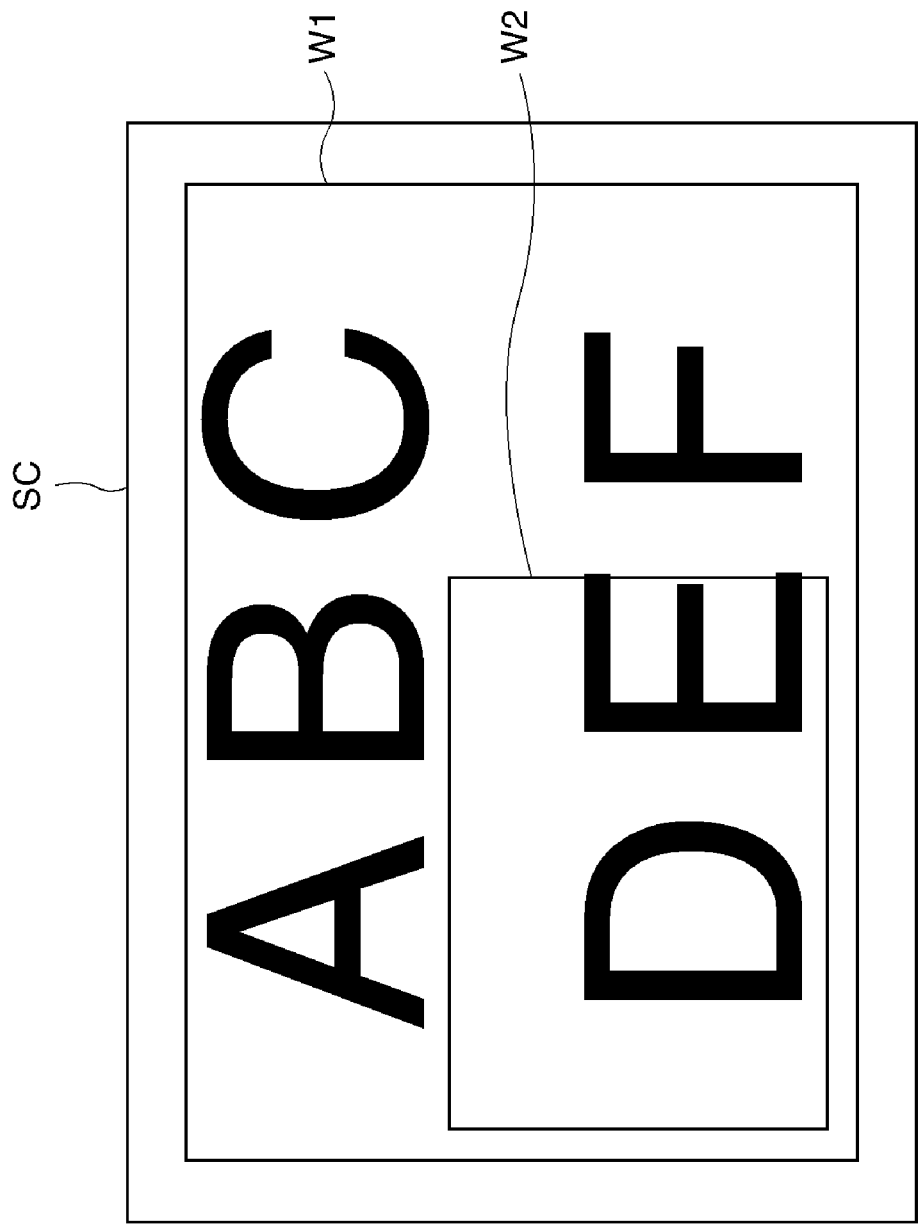
FIG. 16 is a diagram showing the projection windows W1 and W2 displayed on the screen SC by the display apparatus 3.

FIG. 16 shows an example of the image displayed on the screen SC by the distinguishing operation of the third embodiment described above. FIG. 16 shows the image displayed in the case in which the observer M observes apart of the screen SC located on the lower left of the observer from a location with a certain observation distance. As shown in FIG. 16, it is arranged that the display position of the projection window W2 of the second projector 19 is controlled in accordance with the observation location of the observer M (controlled to be the position where the observer and the screen SC are opposed right to each other), and further, the size, the brightness, and the resolution of the projection window W2 should be controlled in accordance with the observation location.

As described above, according to the display apparatus 3 in the present third embodiment, the display position, the size, and the brightness of the projection window W2 of the second projector 19 can be varied in accordance with the observation location and the observation distance, and at the same time, the display can be continued without varying the size of the object displayed in the projection window W2 similarly to the case of the second embodiment. Further, since the display position of the projection window W2 can be moved to the position where the observer is opposed right to the screen SC in accordance with the observation location, it is possible to automatically perform the detailed display of a part of the screen only by getting closer to the part the observer desires to observe in detail. Further, by operating the observation location manually setting section 42 to manually set the part to be displayed in detail, an arbitrary part can be displayed in detail.

Further, similarly to the second embodiment, it is possible to set the projection window W2 to be smaller to display the image near the center thereof with the resolution of the input image signal in the case of making observation from a position close to the screen, and to display the image with the display resolution lowered in accordance the observation distance d so as to correspond to the resolution of the eyesight while keeping the apparent view angle approximately constant by enlarging the projection window W2 in accordance with the distance in the case of making observation from a position away from the screen. Further, since the projection window W1 of the first projector 18 is displayed constantly, it is possible to make observation from a position close to the screen if it is desired to view the details while constantly grasping the overall picture.

It should be noted that although the electric lens shifter 154 for moving the optical axis of the projection lens 151 in parallel is used as a measure of moving the display position of the projection window W2, as another measure, it is also possible to provide to the second projector 19 an oscillating mechanism for moving the exit optical axis in parallel. On this occasion, although the keystone distortion is caused by the projection angle with the screen SC varying in accordance with the display position, it is possible to adaptively correct the distortion by the keystone distortion correction function of the scaling circuit 21 provided to the second projector 19.

Fourth Embodiment

Then, a display apparatus according to a fourth embodiment of the invention will be explained. In the third embodiment described above, the case in which the parameter generation section 33 generates the zoom signal, the image quality control signal, and the extraction range designation signal based on the observation distance signal obtained from the observation distance measurement section 30, and the display position parameter generation section 41 generates the position designation signal based on the observation location signal obtained from the observation location detection section 40 is explained. In contrast, the present fourth embodiment relates to a display apparatus capable of controlling the display position, the size, and the brightness of the second projector 19 by analyzing the characteristic of the content based on the input image signal (image data), and then generating the observation distance signal and the observation location signal in accordance with the analytical result.

Figure 17:
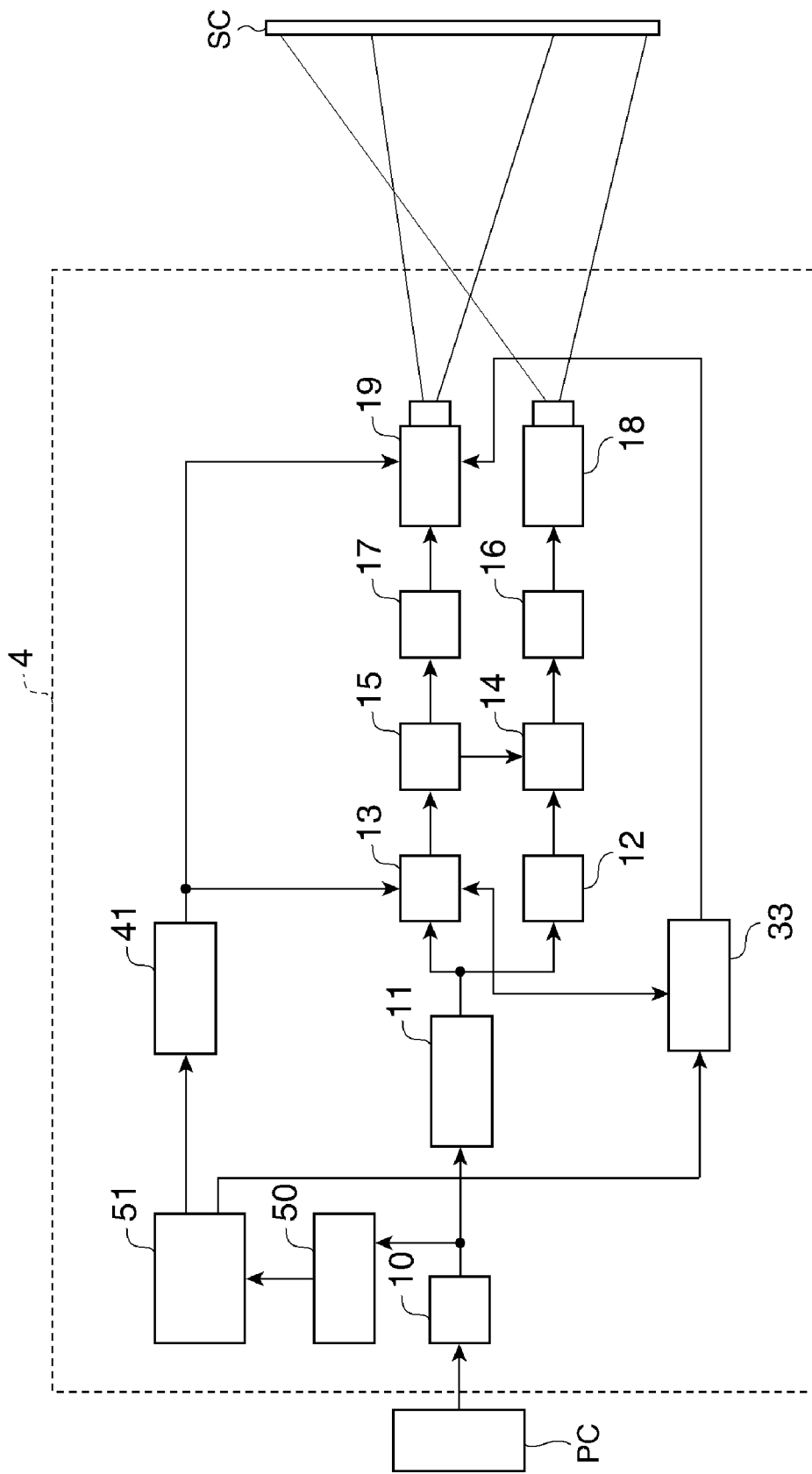
FIG. 17 is a schematic diagram of a configuration of a display apparatus 4 according to a fourth embodiment of the invention.

FIG. 17 is a schematic diagram of a configuration of the display apparatus 4 according to the fourth embodiment. It should be noted that in FIG. 17, substantially the same constituents as those shown in FIG. 13 are denoted with the same reference numerals, and the explanations therefor will be omitted. As shown in FIG. 17, the display apparatus 4 in the fourth embodiment is additionally provided with a content analysis section 50 and a content parameter generation section 51. Further, in the fourth embodiment, the observation distance measurement section 30, the observation distance manually setting section 31, the switching circuit 32, the observation location detection section 40, the observation location manually setting section 42, and the switching circuit 43 are not necessary, and therefore, are eliminated.

Figure 18A:
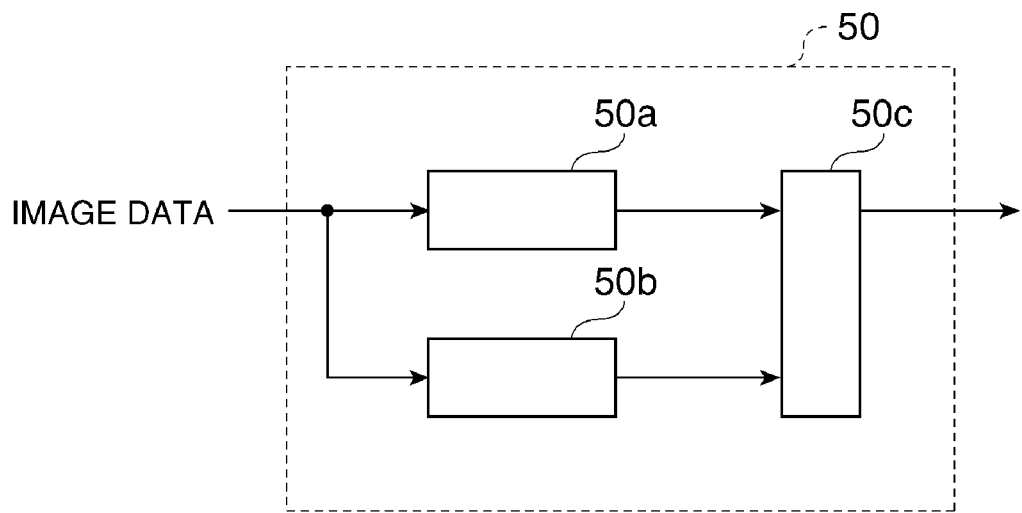
FIGS. 18A and 18B are internal configuration diagrams of an content analysis section 50 in the display apparatus 4.

The content analysis section 50 analyzes the characteristic of the content of the input image signal based on the image data of the input image signal converted into digital data by the A/D converter 10, and outputs the analytical result to the content parameter generation section 51. Specifically, the content analysis section 50 is composed of a motion vector detection section 50a, a spectrum detection section 50b, and a synthetic determination section 50c, as shown in FIG. 18A.

Figure 18B:
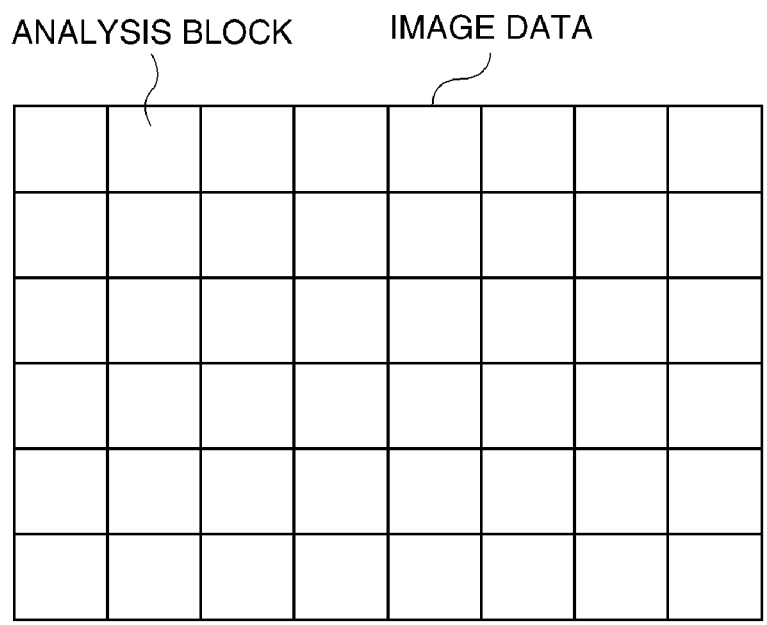

The motion vector detection section 50a detects the vectors of the image based on the image data, and the spectrum detection section 50b detects the spectrum (spatial frequency) of the image based on the image data. It should be noted that the detection of the vectors and the spatial frequency is performed for each analysis block obtained by dividing the entire image data into a plurality of pieces as shown in FIG. 18B. The synthetic determination section 50c determines what type of scene is displayed based on the detection results. The content parameter generation section (observation information determination section) 51 determines the observation distance and the observation location of the observer M based on a scene determination result (an analytical result of the content) of the synthetic determination section 50c, generates the observation distance signal and the observation location signal corresponding to the result, and outputs the observation distance signal to the parameter generation section 33, and the observation location signal to the display position parameter generation section 41.

An operation of the display apparatus 4 in the present fourth embodiment having the configuration described above will hereinafter be explained. It should be noted that hereinafter the explanations of the operation substantially the same as in the third embodiment will be omitted, and the explanations will be presented focusing attention on distinguishing operations in the present fourth embodiment.

Figure 19:
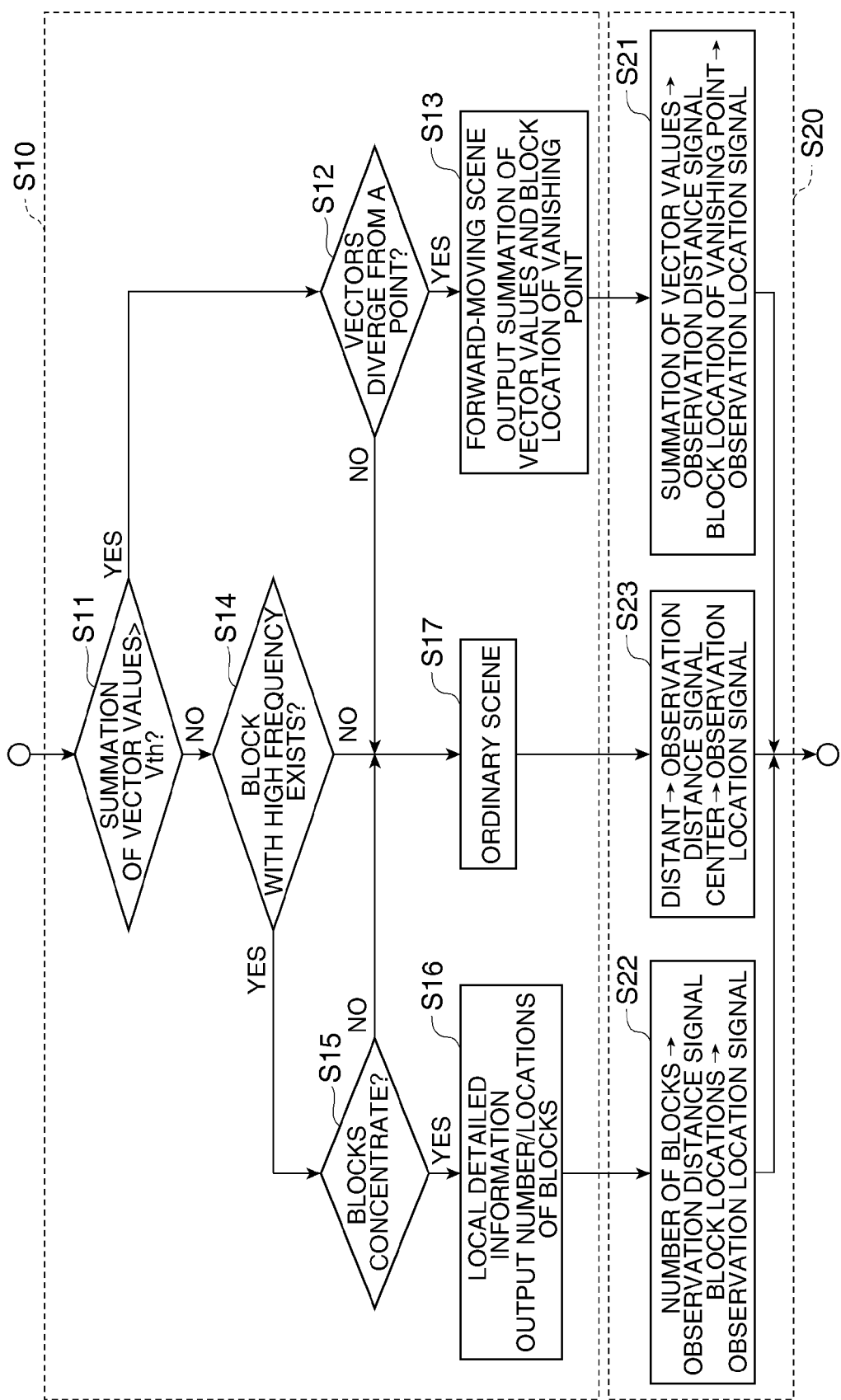
FIG. 19 is an explanatory diagram of an operation of the display apparatus 4.

FIG. 19 is a flowchart showing the operation of the content analysis section 50 and the content parameter generation section 51. It should be noted that in FIG. 19, step S10 shows the operation of the content analysis section 50, and step S20 shows the operation of the content parameter generation section 51.

As shown in FIG. 19, firstly, the motion vector detection section 50a detects the vector in each of the analysis blocks of the image data, and then determines whether or not the summation of the vector values of the respective analysis blocks exceeds a predetermined threshold value Vth (step S11). If the result of the step S11 is "Yes," namely if the summation of the vector values exceeds the threshold value Vth, it is determined that the image is a moving image, and whether or not the vectors diverge from a certain point is subsequently determined (step S12).

If the result of the step S12 is "Yes," namely if the vectors diverge from a certain point, the synthetic determination section 50c determines that the image shows, for example, a forward-moving scene as if looking ahead on a moving vehicle, and outputs the summation of the vector values and the block location of the vanishing point (the point from which the vectors diverge) to the content parameter generation section 51 (step S13).

On this occasion, in the step S21, the content parameter generation section 51 generates the observation distance signal corresponding to the summation of the vector values, and the observation location signal corresponding to the block location of the vanishing point, and then outputs them respectively to the parameter generation section 33 and the display position parameter generation section 41.

Since the observer M generally makes observation focusing on the vanishing point in the direction of movement in the forward scene while moving, it is desirable to display an image with a high resolution around the vanishing point. Further, although the observer may try to view detailed information such as a traffic sign, the image with a high resolution is not required because peripheral view is provided to the peripheral area. Further, the higher the moving speed becomes, the smaller the range the observer concentrates on becomes. In other words, the present display apparatus 4 is capable of matching the center of the display position of the projection window W2 with a high resolution by the second projector 19 with the vanishing point, and further of displaying the peripheral area in the projection window W1 with a low resolution by the first projector 18, and therefore, of performing display corresponding to the characteristic of the moving image as described above.

On the other hand, if the result of the step S11 described above is "No," namely if the summation of the vector values does not exceed the threshold value Vth, the spectrum detection section 50b detects the spatial frequency of each of the analysis blocks, and at the same time, determines whether or not the analysis block with the spatial frequency higher than a reference value exists (step S14). If the result of the step S14 is "Yes," whether or not the analysis blocks with the high spatial frequencies are concentrated in a certain portion is determined (step S15). Further, if the result of the step S15 is "Yes," the synthetic determination section 50c determines that the image represents the scene as if detailed information is displayed locally, and outputs the number and the locations of analysis blocks corresponding to the detailed information to the content parameter generation section 51 (step S16).

On this occasion, in the step S22, the content parameter generation section 51 generates the observation distance signal corresponding to the number of analysis blocks corresponding thereto, and the observation location signal corresponding to the locations of the analysis blocks, and then outputs them respectively to the parameter generation section 33 and the display position parameter generation section 41.

In such a scene that the detailed information is displayed locally, for example, a scene in an education program in which a panel provided with a detailed table and small characters written thereon and an image of an instructor are displayed simultaneously, it is possible to display the detailed information in an eye-friendly manner by displaying the portion of the panel with the projection window W2 with a higher resolution by the second projector 19.

Further, the result of the step S12, S14, or S15 is "No," the synthetic determination section 50c determines that the image represents an ordinary scene (step S17), and the content parameter generation section 51 generates the observation distance signal corresponding to the distant location, and the observation location signal corresponding to the central location, and then outputs them respectively to the parameter generation section 33 and the display position parameter generation section 41.

In other words, in the case of the image (an ordinary scene) without any features to pay attention to, by setting the observation distance to be the distant location, and setting the observation location to be the center, the display position, the size, the brightness, and the resolution of the projection window W2 of the second projector 19 are converted to be the same levels as those of the projection window W1 of the first projector 18, and normal single window display is preformed. It should be noted that as described in the explanations of the second embodiment, on this occasion, since the projection window W1 of the first projector 18 becomes black due to the blanking signal, the degradation in the image quality due to the overlap between the projection windows can be prevented.

As explained above, according to the present first through fourth embodiments, the function equivalent to the high-resolution display can be realized at relatively low cost. Further, since the partial detailed display can be performed while varying the size, the resolution, and the brightness in accordance with the distance and the location of the observer with respect to the screen SC with the overall picture displayed, the display corresponding to the natural human action of getting away from the screen for viewing the overall picture while getting closer to the screen for viewing the details can be performed.

The display apparatuses 1 through 4 in the first through the fourth embodiments described above can be applied to a driving simulator, a ship simulator, an airplane simulator, and so on. Further, in the future, in the case of executing the computerized desktop work while projecting documents on the desk, the display apparatuses 1 through 4 can also be used in the case in which it is not realistic to realize the resolution as high as printed materials in the entire document but only a certain portion of the document to pay attention to, for example, is displayed with the high resolution. On this occasion, since the two projectors are physically separated, and low light output is allowed in the detailed display section, there is a possibility of using a projector with an LED light source or a laser light source, or even a scan projector. By adopting the configuration described above, the whole size of the apparatus can also be reduced.

Figure 20A:
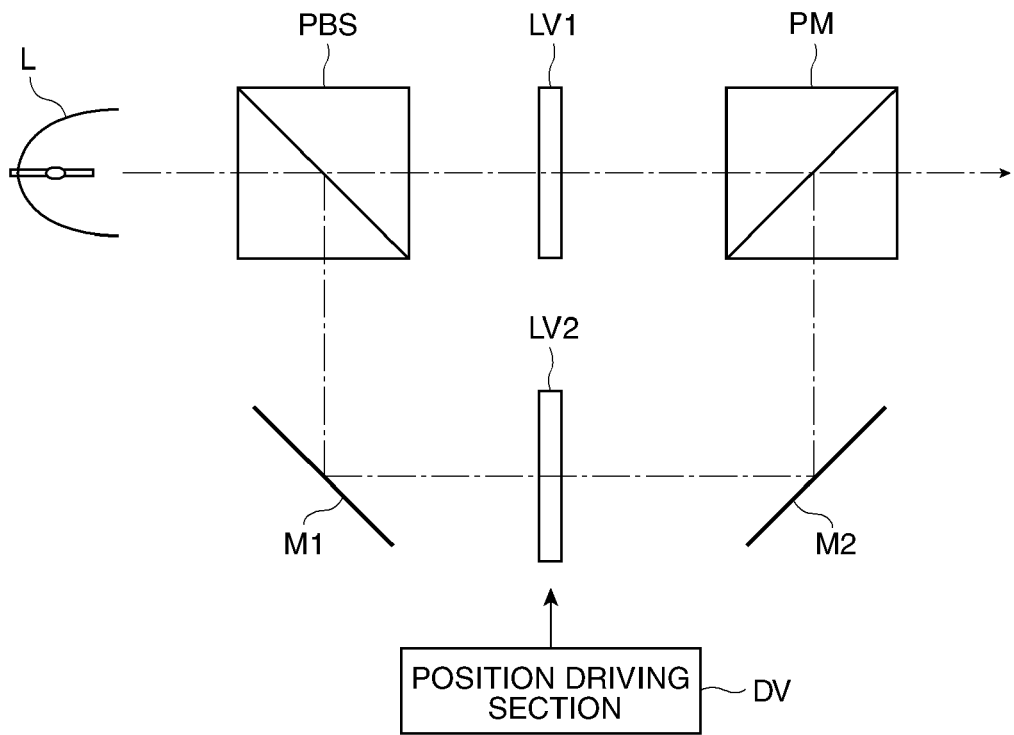
FIGS. 20A and 20B are explanatory diagrams related to a modified example of the present embodiment.
Figure 20B:
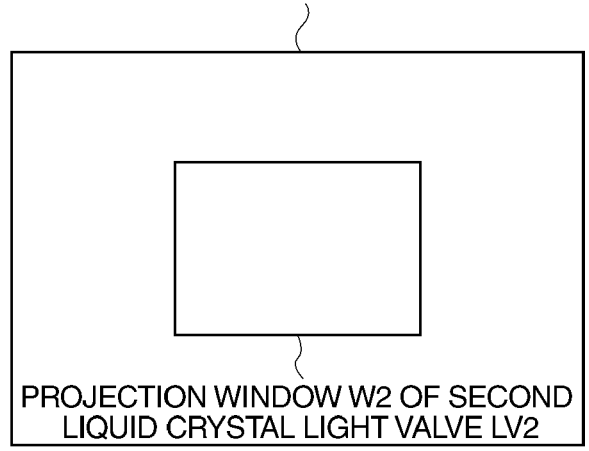

It should be noted that although in the first through the fourth embodiments, the explanations are presented exemplifying the case of using the two projectors, it is also possible to adopt a configuration in which a liquid crystal light valve LV1 for the projection window W1 and a liquid crystal light valve LV2 for the projection window W2 are provided to a single projector, the illumination light of a light source L is blanched by an optical branching prism PBS and a mirror M1 to input the blanched light in the liquid crystal light valve LV1 and the liquid crystal light valve LV2, and the light beams emitted from the liquid crystal light valve LV1 and the liquid crystal light valve LV2 are combined by a combining prism PM and a mirror M2 to output the light beams. Further, the position of the liquid crystal light valve LV2 is arranged to be able to be controlled by a position driving section DV. By adopting such a configuration, as shown in FIG. 20B, it becomes possible to display the projection window W1 and the projection window W2 with a single projector.

Further, although the explanations are presented in the first through the fourth embodiments exemplifying the case in which one projection window W2 (the second window) is displayed overlapping with the projection window W1 (the first window), this is not a limitation, but it is also possible to adopt a configuration of overlapping a plurality of second windows with the first window, namely a configuration provided with a plurality of second light modulation sections.

The entire disclosure of Japanese Patent Application No. 2008-268632, filed Oct. 17, 2008 is expressly incorporated by reference herein.

What is claimed is:

1. A display apparatus adapted to generate image data for controlling a first light modulation section adapted to project a first window, and image data for controlling a second light modulation section adapted to project a second window smaller than the first window and projected so as to overlap with the first window, comprising:
   a first image conversion section adapted to convert a resolution of input image data in accordance a resolution of the first light modulation section to form the image data for controlling the first light modulation section;
   a second image conversion section adapted to extract data included in a range corresponding to a resolution of the second light modulation section among the input image data to form the image data for controlling the second light modulation section;
   an observation distance measurement section adapted to measure an observation distance from a projection screen of the first and second windows to an observer;
   a window size parameter generation section adapted to generate a window size parameter for designating a size of the second window;
   an image quality setting section adapted to set an image quality control parameter for controlling image quality and brightness of the second window based on the window size parameter and the observation distance; and
   an image quality control section adapted to execute an image quality control process on the image data for controlling the second light modulation section obtained from the second resolution conversion section in accordance with the image quality control parameter, such that the brightness of the second window varies according to the window size parameter and the observation distance.

2. A display apparatus adapted to generate image data for controlling a first light modulation section adapted to project a first window, and image data for controlling a second light modulation section adapted to project a second window smaller than the first window and projected so as to overlap with the first window, comprising:
   a first image conversion section adapted to convert a resolution of input image data in accordance a resolution of the first light modulation section to form the image data for controlling the first light modulation section;

a window size parameter generation section adapted to generate a window size parameter for designating a size of the second window;

an extraction range setting section adapted to set an extraction range parameter for designating a range of data to be extracted among the input image data based on the window size parameter;

a second image conversion section adapted to extract data included in an extraction range designated by the extraction range parameter from the input image data, and to convert a resolution of the extracted data according to needs from a relationship between the extraction range and a resolution of the second light modulation section, thereby forming the image data for controlling the second light modulation section;

an observation distance measurement section adapted to measure an observation distance from a projection screen of the first and second windows to an observer;

an image quality setting section adapted to set an image quality control parameter for controlling image quality and brightness of the second window based on the window size parameter and the observation distance; and an image quality control section adapted to execute an image quality control process on the image data for controlling the second light modulation section obtained from the second resolution conversion section in accordance with the image quality control parameter, such that the brightness of the second window varies according to the window size parameter and the observation distance.

3. The display apparatus according to claim 2, further comprising:

a zoom ratio setting section adapted to set a zoom ratio of a projection lens disposed on a posterior stage of the second light modulation section based on the window size parameter; and a zoom control section adapted to control a zoom action of the projection lens in accordance with the zoom ratio set by the zoom ratio setting section.

4. The display apparatus according to claim 3, wherein the window size parameter generation section sets the window size parameter so that a size of an image displayed in the second window becomes constant irrespective of the size of the second window.

5. The display apparatus according to claim 3, further comprising:

wherein the window size parameter generation section generates the window size parameter based on a measurement result of the observation distance by the observation distance measurement section.

6. The display apparatus according to claim 3, further comprising:

the first light modulation section adapted to project the first window;

the second light modulation section adapted to project the second window; and the projection lens a zoom action of which is controlled by the zoom control section, and which is disposed on the posterior stage of the second light modulation section.

7. The display apparatus according to claim 2, further comprising:

a blanking control section adapted to perform control so as to inhibit projection of projection light by the first light modulation section in an area where the first window and the second window overlap with each other.

8. The display apparatus according to claim 2, wherein the first light modulation section and the second light modulation section have the same resolution.

9. The display apparatus according to claim 2, wherein the resolution of the first light modulation section and the second light modulation section is lower than the resolution of the input image data.

10. A display apparatus adapted to generate image data for controlling a first light modulation section adapted to project a first window, and image data for controlling a second light modulation section adapted to project a second window smaller than the first window and projected so as to overlap with the first window, comprising:

a first image conversion section adapted to convert a resolution of input image data in accordance a resolution of the first light modulation section to form the image data for controlling the first light modulation section;

a display position parameter generation section adapted to generate a display position parameter for designating a display position of the second window;

an extraction range setting section adapted to set an extraction range parameter for designating a range of data to be extracted among the input image data;

an observation information determination section adapted to measure an observation distance from a projection screen of the first and second windows to an observer;

a second image conversion section adapted to move a position of the extraction range designated by the extraction range parameter based on the display position parameter, and to extract data included in the extraction range having been moved among the input image data to form the image data for controlling the second light modulation section;

an image quality setting section adapted to set an image quality control parameter for controlling image quality and brightness of the second window based on the window size parameter and the observation distance;

an image quality control section adapted to execute an image quality control process on the image data for controlling the second light modulation section obtained from the second image conversion section in accordance with the image quality control parameter, such that the brightness of the second window varies according to the window size parameter and the observation distance; and a display position control section adapted to control the display position of the second window based on the display position parameter.

11. The display apparatus according to claim 10, further comprising:

a window size parameter generation section adapted to generate a window size parameter for designating a size of the second window;

a zoom ratio setting section adapted to set a zoom ratio of a projection lens disposed on a posterior stage of the second light modulation section based on the window size parameter; and a zoom control section adapted to control a zoom action of the projection lens in accordance with the zoom ratio set by the zoom ratio setting section, wherein the extraction range setting section sets the extraction range parameter based on the window size parameter, and the second image conversion section converts a resolution of the extracted data according to needs from a relationship between the extraction range designated by the extraction range parameter and the resolution of the second light modulation section, thereby forming the image data for controlling the second light modulation section.

12. The display apparatus according to claim 10, further comprising:
  a content analysis section adapted to analyze a characteristic of a content of the input image data; and
  an observation information determination section adapted to determine an observation location of an observer based on an analytical result of the characteristic of the content by the content analysis section,
  wherein the display position parameter generation section generates the display position parameter for designating the display position of the second window based on the observation location determined by the observation information determination section.

13. The display apparatus according to claim 12,
the observation information determination section determining an observation location of an observer based on the analytical result of the characteristic of the content, the display apparatus further comprising:
  a window size parameter generation section adapted to generate a window size parameter for designating the size of the second window based on the observation distance determined by the observation information determination section;
  a zoom ratio setting section adapted to set a zoom ratio of a projection lens disposed on a posterior stage of the second light modulation section based on the window size parameter; and
  a zoom control section adapted to control a zoom action of the projection lens in accordance with the zoom ratio set by the zoom ratio setting section,
  wherein the extraction range setting section sets the extraction range parameter based on the window size parameter, and
  the second image conversion section converts a resolution of the extracted data according to needs from a relationship between the extraction range designated by the extraction range parameter and the resolution of the second light modulation section, thereby forming the image data for controlling the second light modulation section.

14. The display apparatus according to claim 10, wherein a blanking control section adapted to perform control so as to inhibit projection of projection light by the first light modulation section in an area where the first window and the second window overlap with each other.

15. The display apparatus according to claim 10, wherein the first light modulation section and the second light modulation section have the same resolution.

16. The display apparatus according to claim 10, wherein the resolution of the first light modulation section and
the second light modulation section is lower than the resolution of the input image data.

17. The display apparatus according to claim 10, further comprising:
  the first light modulation section adapted to project the first window; and
  the second light modulation section adapted to project the second window.

\* \* \* \* \*